United States Patent
Deasy

(10) Patent No.: US 10,076,209 B2
(45) Date of Patent: Sep. 18, 2018

(54) COFFEE BREWING

(71) Applicant: Matthew Joseph Deasy, Cheshire (GB)

(72) Inventor: Matthew Joseph Deasy, Cheshire (GB)

(73) Assignee: Matthew Joseph Deasy, Cheshire (GB)

( * ) Notice: Subject to any disclaimer, the term of this patent is extended or adjusted under 35 U.S.C. 154(b) by 639 days.

(21) Appl. No.: 14/424,012

(22) PCT Filed: Aug. 21, 2013

(86) PCT No.: PCT/GB2013/052207
§ 371 (c)(1),
(2) Date: Feb. 25, 2015

(87) PCT Pub. No.: WO2014/033432
PCT Pub. Date: Mar. 6, 2014

(65) Prior Publication Data
US 2015/0238041 A1   Aug. 27, 2015

(30) Foreign Application Priority Data

Aug. 26, 2012 (GB) .................. 1215195.7
Dec. 19, 2012 (GB) .................. 1222967.0

(51) Int. Cl.
*A47J 31/20* (2006.01)
*A47J 31/44* (2006.01)
*A23F 5/26* (2006.01)
*A47J 31/46* (2006.01)

(52) U.S. Cl.
CPC ........... *A47J 31/4403* (2013.01); *A23F 5/265* (2013.01); *A47J 31/20* (2013.01); *A47J 31/467* (2013.01)

(58) Field of Classification Search
CPC ...... A47J 31/4403; A47J 31/467; A23F 5/265
USPC ..... 99/283.29, 295, 297, 300, 308; 426/431, 426/433
See application file for complete search history.

(56) References Cited

U.S. PATENT DOCUMENTS

| 6,561,080 B1 | 5/2003 | Feeney |
| 6,711,988 B1 * | 3/2004 | Eugster .................. A47J 31/36 99/283 |
| 2005/0046211 A1 * | 3/2005 | Nole .................. B65D 25/2832 294/27.1 |

(Continued)

FOREIGN PATENT DOCUMENTS

| FR | 2651664 | 3/1991 | |
| FR | 2651664 A1 * | 3/1991 | ............. A47J 31/20 |
| WO | WO 2003/063662 | 8/2003 | |

OTHER PUBLICATIONS

Internation search report for PCT/GB2013/052207, dated Feb. 14, 2014.

(Continued)

*Primary Examiner* — Thien S Tran
(74) *Attorney, Agent, or Firm* — Brian S. Boyer; Syndicated Law, PC

(57) ABSTRACT

There are provided drinking vessels adapted to receive coffee grounds and water to brew coffee wherein the drinking vessels comprise pump means. In one embodiment a drinking vessel (100,200) comprises a first chamber adapted to receive coffee grounds and hot water, a second chamber adapted to receive brewed coffee and a third chamber adapted to receive brewed coffee. Also provided drinking vessel sections (101,102,201,202), a kit of parts and a method of brewing coffee.

16 Claims, 19 Drawing Sheets

(56) References Cited

U.S. PATENT DOCUMENTS

2011/0056385 A1* 3/2011 McLean ............... A47J 31/20
99/297
2011/0088561 A1 4/2011 Bodum

OTHER PUBLICATIONS

Written opinion for PCT/GB2013/052207, International Searching Authority.

* cited by examiner

COFFEE BREWING

CROSS-REFERENCE TO RELATED APPLICATION

This application is a national stage of PCT Application No. PCT/GB2013/052207, filed Aug. 21, 2013, which claims the benefit of GB Application Nos. 1215195.7, filed Aug. 26, 2012, and 1222967.0, filed Dec. 19, 2012, each application of which is incorporated herein by reference in its entirety.

FIELD OF INVENTION

The present invention relates to coffee brewing, particularly though not exclusively to drinking vessels adapted to receive coffee grounds and water to brew coffee.

BACKGROUND TO THE INVENTION

There are various known methods for brewing coffee. A widely known method of brewing coffee in a cup or mug is to use instant coffee granules. However, many coffee drinkers prefer the taste of ground coffee. Coffee can be brewed from coffee grounds in a number of ways including with a percolator or a cafetiere. This may provide a better flavour than instant coffee but it does not have the same convenience as instant coffee. Attempts have been made to make the use of coffee grounds more convenient and one solution has been to provide cafetiere mugs and cups. However, such cafetiere type drinking vessels can have a relatively long brew time. There thus remains a need for a drinking vessel which provides a convenient way to brew coffee from coffee grounds.

Accordingly, the present invention aims to address at least one disadvantage associated with the prior art whether discussed herein or otherwise.

SUMMARY OF INVENTION

According to a first aspect of the present invention there is provided a drinking vessel adapted to receive coffee grounds and water to brew coffee wherein the drinking vessel comprises pump means.

Suitably, there is provided a drinking vessel adapted to receive coffee grounds and water to brew coffee wherein the drinking vessel comprises pump means adapted to pump brewed coffee into a chamber of the drinking vessel such that it can be drunk.

Suitably, the drinking vessel comprises two or more sections which are separable from one another. Suitably, the drinking vessel comprises two sections which are separable from one another. Suitably, the drinking vessel is adapted to be separated into two sections. Suitably, the drinking vessel is adapted to be separated into only two sections. The drinking vessel may be supplied in two sections.

Suitably, the drinking vessel comprises two sections which are moveable relative to one another when assembled to form the drinking vessel. Suitably, the drinking vessel comprises two sections which can be slid relative to one another. Suitably, the pump means of the drinking vessel is operated by sliding two sections of the drinking vessel relative to one another.

The drinking vessel may comprise two sections and one or more of said sections may comprise two or more parts which may be separable for cleaning and/or maintenance.

Suitably, each section comprises two or more parts which may be separable for cleaning and/or maintenance.

Suitably, the drinking vessel comprises a base section and a pump section.

Suitably the pump section can be slid relative to the base section to pump brewed coffee into a chamber of the drinking vessel from which the brewed coffee can then be drunk. The pump section may comprise a lid which may be detached from the remainder of the pump section.

Suitably, the drinking vessel is adapted such that coffee can be brewed from hot water and coffee grounds within the vessel and brewed coffee can be drunk from the drinking vessel. Suitably, the hot water, coffee grounds and brewed coffee remain within the drinking vessel during the brewing process. Suitably, no apparatus other than the drinking vessel is required for a user to brew and drink coffee provided the user has access to hot water and coffee grounds.

Suitably, the drinking vessel comprises a chamber adapted for brewing coffee in. Suitably, the drinking vessel comprises a chamber adapted to receive water. Suitably, the drinking vessel comprises a chamber adapted to receive water and which chamber has one or more outlets at the base thereof. Suitably, the drinking vessel comprises a chamber adapted to receive hot water. Suitably, the drinking vessel comprises a chamber adapted to receive coffee grounds.

Suitably, the drinking vessel comprises a chamber adapted to receive coffee grounds and water. Suitably, the drinking vessel comprises a chamber adapted to receive coffee grounds and hot water.

The drinking vessel may comprise two chambers adapted to receive water one of which is also adapted to receive coffee grounds. The drinking vessel may comprise two chambers adapted to receive water one of which is adapted to receive milk and/or sugar as well as or instead of water. The drinking vessel may comprise two chambers adapted to receive hot water one of which is also adapted to receive coffee grounds. The drinking vessel may comprise two chambers adapted to receive hot water one of which is also adapted to receive milk and/or sugar as well as or instead of hot water.

Suitably, the drinking vessel comprises a chamber adapted to receive brewed coffee. The drinking vessel may comprise two or more chambers adapted to receive brewed coffee.

Suitably, the drinking vessel comprises a first chamber adapted for brewing coffee in. Suitably, the drinking vessel comprises a first chamber adapted to receive water. Suitably, the drinking vessel comprises a first chamber adapted to receive water and which chamber has one or more outlets at the base thereof. Suitably, the drinking vessel comprises a first chamber adapted to receive hot water. Suitably, the drinking vessel comprises a first chamber adapted to receive coffee grounds. Suitably, the drinking vessel comprises a first chamber adapted to receive coffee grounds and water. Suitably, the drinking vessel comprises a first chamber adapted to receive coffee grounds and hot water.

The drinking vessel may comprise a first chamber adapted to be charged with water, suitably hot water, by a user. The drinking vessel may comprise a first chamber adapted to be charged with coffee by a user.

The drinking vessel may comprise a third chamber adapted to receive water, suitably hot water, and which may also be adapted to receive milk and/or sugar as well as or instead of water. The drinking vessel may comprise a third chamber adapted to be charged with hot water and/or milk and/or sugar by a user and to then have brewed coffee pumped into it from a first chamber. The third chamber may be adapted to allow milk and/or sugar and/or hot water to combine with brewed coffee therein to form brewed coffee to a user's preferred flavor.

Suitably, the drinking vessel comprises a second chamber adapted to receive brewed coffee. Suitably the drinking vessel comprises a second chamber adapted to receive ready to drink coffee which may comprise brewed coffee with milk and/or sugar included to a user's preferred flavour. The drinking vessel may comprise a third chamber adapted to receive brewed coffee. The drinking vessel may comprise second and third chambers adapted to receive brewed coffee.

The drinking vessel may comprise a second chamber which is adapted to receive brewed coffee and allow coffee to be drunk there from. The drinking vessel may comprise a third chamber which is adapted to receive brewed coffee and allow coffee to be drunk there from. The drinking vessel may comprise second and third chambers which are adapted to receive brewed coffee and allow coffee to be drunk there from.

Suitably, the drinking vessel comprises filter means. Suitably, the filter means is adapted to substantially prevent coffee grounds passing there through. Suitably, a filter means is located in the path of an outlet of a first chamber. A filter means may be located in the path of an inlet of a second chamber and/or in the path of an inlet of a third chamber. A filter means is suitably located in the a flow path between the first and third chambers. Suitably, the drinking vessel comprises a first chamber which outlets into a third chamber via a filter means.

Suitably, the drinking vessel comprises flow control means.

Suitably the flow control means is adapted to control the rate at which water and/or brewed coffee can be pumped into a chamber. Suitably, the flow control means is adapted to direct the flow path of water and/or brewed coffee as it is pumped into a chamber such that it may aid mixing of brewed coffee in said chamber. Suitably, the flow control means comprises directional outlets of the first chamber. Suitably, the flow control means is adapted to assist mixing of brewed coffee and/or hot water which exit the first chamber with milk and/or sugar and/or hot water in the third chamber.

Suitably, the flow control means is located downstream of the filter means. Suitably, the flow control means is located immediately downstream of the filter means. Suitably, the flow control means is adapted to support the filter means. Suitably, the flow control means is located at the base of the first chamber.

Suitably, the pump means is adapted to pump brewed coffee into a second chamber of the drinking vessel. Suitably, the pump means is adapted to pump brewed coffee into a third chamber of the drinking vessel. Suitably, the pump means is adapted to pump brewed coffee into second and third chambers of the drinking vessel.

Suitably, the pump means is adapted to pump water and or brewed coffee from a first chamber of the drinking vessel. Suitably, the pump means is adapted to pump water and/or brewed coffee out of a first chamber of the drinking vessel.

Suitably, the pump means is adapted to pump water towards a filter means. Suitably, the pump means is adapted to pump water towards one or more outlets of a first chamber. Suitably, the pump means is adapted to pump water and/or brewed coffee through one or more outlets of a first chamber. Suitably, the pump means is adapted to pump water and/or brewed coffee through one or more outlets of a first chamber and into a second and/or third chamber.

Suitably, the pump means is adapted to pump water and/or brewed coffee through a filter means. Suitably, the pump means is adapted to pump water and/or brewed coffee through a filter means and into a second and/or third chamber.

Suitably, the drinking vessel is adapted to receive loose coffee grounds. The drinking vessel may be adapted to receive cartridges containing coffee grounds. The cartridges may comprise filter means.

The drinking vessel may comprise a base section which comprises two or more parts which may be separable for cleaning and/or maintenance.

The base section may comprise an outer part and an inner part. The base section may comprise an outer part and an inner part which are engaged. The base section may comprise an outer part and an inner part which are threadedly engaged.

The base section may comprise an outer part and an inner part connected such that a first chamber is defined on one side of a wall of said first part and a third chamber is defined between an opposed side of said wall and the second part. Suitably, the inner part comprises apertures allowing fluid communication between said third and first chambers.

The base section may comprise an outer part and an inner part connected such that a second chamber is defined on one side of a wall of said first part and a third chamber is defined between an opposed side of said wall and the second part. Suitably, the inner part comprises apertures allowing fluid communication between said third and second chambers.

The base section may comprise an outer part and an inner part connected such that a first and second chamber are defined on one side of a wall of said first part and a third chamber is defined between an opposed side of said wall and the second part. The first and second chamber may occupy the same space and the pump means may move within said space to define which part of said space comprises each of said first and second chambers.

The base section may comprise a flow control member. The base section may comprise a filter means. The base section may comprise a filter means retaining means.

The base section may comprise a flow control member engaged with a first part. The base section may comprises a flow control member threadingly engaged with a first part.

The base section may comprises a flow control member engaged with a first part with a filter means retained in place therebetween. The base section may comprises a flow control member threadingly engaged with a first part with a filter means retained in place therebetween.

The drinking vessel may comprise a pump section which comprises two or more parts which may be separable for cleaning and/or maintenance.

The pump section may comprises a pump part and a lid part. The pump section may comprise a pump part and a lid part which are engaged. The pump section may comprise a pump part and a lid part which are threadedly engaged.

The pump section may comprise means for selectively allowing access to the interior of the pump part. The pump section may comprise means for selectively allowing access to a chamber defined by the pump part. The pump section may comprise means for selectively allowing access to a chamber defined by the pump part and a first part of the base section. The pump section may comprise means for selectively allowing access to a second chamber. Said means may comprise an aperture in the lid part and a closure therefore.

The vessel may comprise means for selectively allowing access to a second chamber to charge said second chamber with milk and/or sugar and/or water in use. The vessel may comprise aperture into the second chamber and a closure therefore adapted to selectively allow access to said second chamber to charge said second chamber with milk and/or sugar and/or water in use. The vessel may thus be adapted such that, in use, a brewed coffee, for example an Americano, may be produced without pumping all the components past coffee grounds and thus this may prevent a bitter brewed coffee from being produced.

Suitably, the vessel is adapted such that, in use, gravity can cause water and/or brewed coffee to pass through a filter means. Suitably, the vessel is adapted such that, in use, gravity can cause water to pass through a bed of coffee grounds. Suitably, the vessel is adapted such that, in use, gravity can cause water to pass through a bed of coffee grounds supported on a filter means.

Suitably, the vessel is adapted such that, in use, water and/or brewed coffee is pumped through a filter means. Suitably, the vessel is adapted such that, in use, water is pumped through a bed of coffee grounds. Suitably, the vessel is adapted such that, in use, water is pumped through a bed of coffee grounds supported on a filter means.

Suitably, the vessel is adapted such that, in use, gravity can cause water and/or brewed coffee to pass through a filter means until a liquid level in the first and third chamber is at equilibrium and the vessel is suitably adapted such that the remaining water and/or brewed can then be pumped through the filter means from the first chamber into the third chamber and the vessel is suitably adapted such brewed coffee can flow from the third chamber to the second chamber as said remaining water and/or brewed coffee is pumped from the first chamber.

Suitably, the vessel is adapted such that, in use, gravity can cause water and/or brewed coffee to pass through a bed of coffee grounds until a liquid level in the first and third chamber is at equilibrium and the vessel is suitably adapted such that the remaining water and/or brewed can then be pumped through the bed of coffee grounds from the first chamber into the third chamber and the vessel is suitably adapted such brewed coffee can flow from the third chamber to the second chamber as said remaining water and/or brewed coffee is pumped from the first chamber.

Suitably, the vessel is adapted such that, in use, gravity can cause water and/or brewed coffee to pass through a bed of coffee grounds supported on a filter means until a liquid level in the first and third chamber is at equilibrium and the vessel is suitably adapted such that the remaining water and/or brewed can then be pumped through the bed of coffee grounds supported on a filter means from the first chamber into the third chamber and the vessel is suitably adapted such brewed coffee can flow from the third chamber to the second chamber as said remaining water and/or brewed coffee is pumped from the first chamber.

Suitably, the vessel is adapted such that, in use, the filter means remains substantially stationary relative to the base section of the vessel. Suitably, the vessel is adapted such that, in use, the pump means moves relative to the filter means. Suitably, the vessel is adapted such that, in use, the pump section moves relative to the filter means.

Suitably, the vessel comprises first, second and third chambers. Suitably, the vessel is adapted such that, in use, brewed coffee is conveyed from a first chamber to a third chamber and some of said brewed coffee is then conveyed to a second chamber.

Suitably, the third chamber has a substantially fixed capacity. Suitably, the first chamber has variable capacity. Suitably, the second chamber has variable capacity. Suitably, the vessel is adapted such that, in use, the capacity of the second chamber increases as that of the first chamber decreases. Water and/or brewed coffee displaced from the first chamber is thus suitably accommodated in the third chamber and second chamber.

Suitably, the second chamber and first chamber are defined by a housing and separated by a pump member which travels in said housing such that the space defined by said housing selectively forms said first and/or second chambers. Suitably, said housing comprises an inner part of the base section.

The vessel may be adapted such that the first chamber is only adapted to be charged with water and coffee grounds when the vessel is in an open configuration. The vessel may be adapted such that the second chamber is only be formed as the vessel is moved toward a drinking configuration. The vessel may be adapted such that the first chamber has near zero liquid capacity when the vessel is in the drinking configuration.

The vessel may be adapted such that once the vessel is in a drinking configuration a brewing process is substantially stopped and there is suitably substantially no interaction between brewed coffee and coffee grounds.

Suitably, in use, once the vessel is in a drinking configuration coffee grounds are compressed into a coffee puck and there is suitably substantially no further brewing.

Suitably, is use, brewed coffee which is conveyed to the second chamber is located away from the coffee grounds and so suitably cannot become over brewed and/or bitter.

The vessel may comprise a one way valve to allow brewed coffee to flow from a first chamber to a second chamber but not from a second chamber to a first chamber. The vessel may comprise a one way valve to allow brewed coffee to flow from a first chamber to a third chamber but not from a third chamber to a first chamber. The vessel may comprise a one way valve located downstream of a filter means, suitably immediately downstream thereof. The vessel may comprise a one way valve, for example a float, located between a filter means and a flow control means.

The vessel may comprise angled outer surfaces to assist with separation of a pump section and a base section when desired by a user. The vessel may comprise a transparent part. The vessel may comprise a transparent base section.

The vessel may comprises a third chamber adapted to substantially prevent the possibility of an air lock forming when the pump means is operated in use.

Suitably, the third chamber has a capacity at least 50% of that of the first chamber's maximum capacity. The third chamber may have a capacity substantially the same as that of the first chamber's maximum capacity. The third chamber suitably has a capacity no more than 150% of that of the first chamber's maximum capacity.

Suitably, the third chamber has a capacity at least 50% of that of the second chamber's maximum capacity. The third chamber may have a capacity substantially the same as that of the second chamber's maximum capacity. The third chamber suitably has a capacity no more than 150% of that of the second chamber's maximum capacity.

Suitably, the first chamber has a capacity at least 50% of that of the second chamber's maximum capacity. The first chamber may have a capacity substantially the same as that of the second chamber's maximum capacity. The first chamber suitably has a capacity no more than 150% of that of the second chamber's maximum capacity.

Suitably, there is provided a drinking vessel adapted to receive coffee grounds and hot water to brew coffee wherein the drinking vessel comprises:

(i) a first chamber adapted to receive hot water;
(ii) a second chamber adapted to receive brewed coffee;
(iii) filter means; and
(iv) pump means adapted to pump brewed coffee into said second chamber.

Suitably, there is provided a drinking vessel adapted to receive coffee grounds and hot water to brew coffee wherein the drinking vessel comprises:
(i) a first chamber adapted to be charged with hot water and coffee grounds;
(ii) a third chamber adapted to be charged with hot water and/or milk and/or sugar;
(iii) a second chamber adapted to receive brewed coffee;
(iv) filter means; and,
(v) pump means adapted to pump brewed coffee into said second chamber.

Suitably, the filter means comprises a mesh, suitably a metal mesh. The filter means may comprise a mesh plate. The filter means may comprise a photo etched plate. The filter means may comprise a mesh formed by photo etching a plate. Suitably, the filter means comprises a mesh having apertures with largest dimension of 0.1 mm or less, suitably 0.05 mm or less, for example 0.04 mm. Suitably, the filter means comprises a mesh having apertures with diameter of 0.1 mm or less, suitably 0.05 mm or less, for example 0.04 mm. Suitably the filter means comprises a mesh having at least 300 wires per linear inch, suitably at least 350 wires per linear inch, for example 400 or more wires per linear inch. Suitably, the filter means comprises a fine mesh, suitably an ultrafine mesh.

Suitably, the filter means comprises a mesh adapted to substantially prevent un-dissolved coffee grounds entering the second chamber. Suitably, the filter means comprises a mesh adapted to allow brewed coffee to readily pass there through.

Suitably, the filter means is located by an outlet of the first chamber. Suitably, the filter means is located at the base of the first chamber. Suitably, the filter means is located at the base of the first chamber in the path of the or each outlet of the first chamber.

Suitably, the filter means is adapted to be removed for cleaning of the drinking vessel. Suitably, the filter means is adapted such that it can only be removed with the aid of a tool. Alternatively, the vessel may be adapted such that the filter means can be removed without a tool.

Suitably, the first chamber is adapted to receive coffee grounds such that they can combine with water within said first chamber. Suitably, the drinking vessel is adapted to receive coffee grounds such that they can be positioned over a filter means at the base of the first chamber prior to the introduction of water to the first chamber and/or such that coffee grounds gather over a filter means at the base of the first chamber as water and/or brewed coffee is pumped from the chamber.

Suitably, the pump means is adapted to pump hot water and/or brewed coffee towards the filter means. Suitably, the pump means is adapted to pump hot water and/or brewed coffee out of said first chamber via one or more outlets.

Suitably, the pump means comprises a pump member. Suitably, the drinking vessel is adapted such that liquid can not flow past or through the pump member.

Suitably, the pump means comprises a pump member adapted to locate into the first chamber. Suitably, the pump means comprises a piston. Suitably, the pump means comprises a piston adapted to locate into the first chamber.

Suitably, the drinking vessel comprises a first chamber adapted to provide a housing to a pump member in use. Suitably, the drinking vessel comprises a base section defining a housing for a pump member of the pump section. Suitably, the drinking vessel comprises a base section having a first chamber which is adapted to provide a housing to a pump member in use.

Suitably, the pump means comprises a pump member adapted to form a seal with a wall defining a first chamber of the drinking vessel in use. Suitably, the first chamber has a cylindrical cross section, Suitably, the first chamber has a circular cross section. Suitably, the pump member comprises a lower, in use, part having a circular cross section arranged to closely fit within the first chamber and carries seal means for forming a seal with the wall of the first chamber.

The drinking vessel suitably comprises a first chamber having variable size. The drinking vessel suitably comprises a second chamber having variable size. The drinking vessel may comprise first and second chambers separated from one another by a moveable wall such that the size of the first chamber may be decreased as the size of the second chamber is increased and vice versa. The first and second chambers may share a common outer wall and may be separated from one another by a moveable internal wall forming section of a pump member. Suitably, said internal wall is impermeable to liquids. Suitably, said internal wall is impermeable to fluids. Suitably, said internal wall is impermeable to water and/or steam.

Suitably, the pump means is adapted to pump water through the filter means into the second chamber. Suitably, the pump means is adapted to pump water through coffee grounds and the filter means into the second chamber. Suitably, the pump means is adapted to pump brewed coffee through the filter means into the second chamber.

The pump means may be adapted to pump hot water and/or brewed coffee into the second chamber via a third chamber. The third chamber may comprise a conduit or pipe. The third chamber may comprise a chamber partially or fully encircling the first chamber. Alternatively, the third chamber may comprise a chamber partially or fully encircled by the first chamber.

Suitably, the pump means is adapted to displace water from the first chamber into the second chamber. Suitably, the pump means is adapted to displace brewed coffee from the first chamber into the second chamber.

Suitably, the pump means is hand operated. Suitably, the pump means is hand powered.

Suitably, the drinking vessel is comprised of two sections. Suitably, the drinking vessel comprises a base section and a pump section. The pump section may be a piston section. Suitably, the drinking vessel comprises a base section and a piston section.

Suitably, the drinking vessel comprises a base section and an pump section which can be separated from one another. Suitably, in use the base section and pump section may be separated to allow hot water and coffee grounds to be introduced to the vessel and/or to allow cleaning of the vessel.

Suitably, the base section and pump section are adapted to slide relative to one another.

Suitably, the base section comprises said first chamber. Suitably, the base section comprises said first chamber and said first chamber is adapted to receive a pump member.

The pump section may comprise said second chamber. The pump section may comprise a hollow pump member and said second chamber may be located within said hollow pump member. Alternatively, or in addition the base section may comprise all or part of said second chamber.

Suitably, the base section comprises an open chamber into which the pump member of the pump section is located in use such that the pump member sub-divides said open chamber into a first chamber located below the pump member and a second chamber located above part of the pump member.

The base section may comprise a third chamber adapted to receive brewed coffee from said first chamber and to convey it to said second chamber. The base section may comprise a third chamber arranged to convey brewed coffee from the base of said first chamber to said second chamber.

The base section may comprise a conduit adapted to convey brewed coffee from said first chamber to said second chamber. The base section may comprise a conduit arranged to convey brewed coffee from the base of said first chamber to said second chamber.

Suitably, the drinking vessel is adapted to be operable between an open configuration in which it may be loaded with water and coffee grounds and a drinking configuration in which brewed coffee may be drunk from it. Suitably, the drinking vessel is adapted to be moved between said open configuration and said drinking configuration by moving sections of the vessel relative to one another to pump brewed coffee to a chamber of the drinking vessel from which it can be drunk.

Suitably, the pump section is adapted to allow brewed coffee to enter the second chamber as the drinking vessel is moved towards a drinking configuration. Suitably, the pump section is adapted to allow brewed coffee to enter the second chamber as the pump section is slid relative to the base section. Suitably, the pump section comprises a hollow pump member defining the second chamber and the pump member has one or more slits or apertures therein to allow brewed coffee to enter it.

Suitably, the drinking vessel comprises means to direct the flow of brewed coffee within the second chamber. The drinking vessel may comprise means to cause brewed coffee to circulate in the second chamber to obtain a homogenous mix. The pump means may comprise means to direct the flow of water within the second chamber. Suitably, the pump member has wall parts with one or more apertures or slits therein and one or more of said wall parts comprises a deflector section to direct the flow of brewed coffee as it enters through said apertures or slits.

Suitably, the drinking vessel comprises means to direct the flow of brewed coffee within the third chamber. The drinking vessel may comprise means to cause brewed coffee to circulate in the third chamber to obtain a homogenous mix. The drinking vessel may comprise means to cause brewed coffee to mix with water/and or sugar, suitably in the third chamber.

The drinking vessel may be adapted such that the first chamber may be charged with coffee grounds and hot water and the combination stirred while brewed coffee exits the first chamber into the third until the level of brewed coffee/hot water is at equilibrium in the first and third chambers. The drinking vessel may be adapted such that coffee grounds may then be allowed to settle to the bottom of the first chamber causing a plug and the level of water within the first chamber may then be topped up. The drinking vessel may be adapted such that the pump means may then be used to pump brewed coffee/hot water out of the first chamber.

The drinking vessel may be adapted such that the second chamber occupies space previously occupied by the first chamber as the drinking vessel is moved to the drinking configuration. Brewed coffee may thus be returned to the space previously occupied by the water.

Suitably, the drinking vessel comprises means to protect a user from scalding in the event of failure of the pumping means. Suitably, the drinking vessel comprises means to insulate brewed coffee to keep it warm in use. Suitably, the drinking vessel comprises means to insulate a user from the contents thereof in use.

Suitably, the drinking vessel comprises a shroud. Suitably, the pump section comprises a shroud. Suitably, the pump section comprises a shroud adapted to form the outer wall of the drinking vessel in use. Suitably, the pump section comprises a shroud adapted to substantially encircle the base section when the drinking vessel is in a drinking configuration. The base section may comprise a shroud.

Suitably, the drinking vessel comprises means to restrict liquids spilling there from. Suitably, the drinking vessel comprises means to restrict brewed coffee spilling there from. Suitably the drinking vessel comprises a mouthpiece. Suitably, the drinking vessel comprises spill retention means. Suitably, the spill retention means comprises a lip at the top of the drinking vessel.

Suitably, the drinking vessel comprises a cup. Suitably, the drinking vessel comprises a cup sized to fit in a cup holder, suitably an automobile cup holder. Alternatively, the drinking vessel may comprise a mug.

Suitably, the drinking vessel is adapted to be used with finely ground coffee. Suitably, the drinking vessel is adapted to be used with fine coffee grounds. Suitably the drinking vessel is adapted to be used with coffee grounds having particles with a largest dimension in any direction of no greater than 0.4 mm, suitably no greater than 0.3 mm, for example no greater than 0.2 mm.

Suitably, the drinking vessel is adapted to allow rapid brewing of coffee. Suitably, the drinking vessel is adapted to allow rapid brewing of coffee from grounds within the vessel. Suitably, the drinking vessel is adapted such that brewed coffee can be conveyed to a chamber from which it may be drunk within 1 minute of hot water and coffee grounds first being combined in the vessel. The drinking vessel may be adapted such that brewed coffee can be conveyed to a chamber from which it may be drunk within 30 seconds of hot water and coffee grounds first being combined in the vessel.

Suitably, the drinking vessel is adapted to brew coffee through the bottom of the drinking vessel and return it within the drinking vessel. This may allow everything to be contained within the drinking vessel, without external apparatus being required.

Suitably, the drinking vessel has one or more outer shrouds which shield the user from hot vapours coming out of the vessel, or potential seal failures. Suitably, the drinking vessel shroud or shrouds also act as an insulator protecting the user when they hold the vessel, from the hot liquid contained within.

Suitably, the brew process and cleaning is extremely simple. Suitably, to be cleaned out the base section is simply turned upside down and given a tap once the pump section is detached. Suitably, due to the coffee being compacted by the brewing method it will suitably fall out, and then the drinking vessel sections can suitably be just rinsed out with water.

The brew process may require coffee to be ground to a specific (finer) consistency to speed up the brew time. The current standard for ground coffee may be too coarse and may produce a weak watery coffee if used in the drinking vessel due to the reduced brewing time that the device may operate to.

Suitably, coffee that is put into the vessel is ground at a finer grind than normal which may give a greater surface area and may allow the coffee to be brewed much faster. Suitably, a micro-fine mesh is used to stop grounds getting into the final brewed product.

Suitably, the pumping method further speeds up the brewing time compared to a standard method by creating a manual pressure from the user under which the coffee is brewed (suitably in less than 30 seconds).

Suitably, all of the water is pushed through the coffee at the base of the vessel, thus suitably extracting the maximum flavour from the coffee at a faster rate. Brewing by just stirring the grounds in hot water may be much slower than this method (approximately 3-4 minutes).

According to a second aspect of the present invention there is provided a section of a drinking vessel wherein the section comprises a base section adapted to form part of a drinking vessel according to the first aspect.

The base section may comprise any feature as described in relation to the first aspect.

According to a third aspect of the present invention there is provided a section of a drinking vessel wherein the section comprises a pump section adapted to form part of a drinking vessel according to the first aspect.

The pump section may comprise any feature as described in relation to the first aspect.

According to a fourth aspect of the present invention there is provided a kit of parts wherein the kit comprises a drinking vessel according to the first aspect and/or a section of a drinking vessel according to the second and/or third aspect together with a cleaning apparatus.

Suitably, the cleaning apparatus comprises a brush. Suitably, the cleaning apparatus comprises a hook. The cleaning apparatus may comprises a brush and hook which may be integral.

According to a fifth aspect of the present invention there is provided a method of brewing coffee wherein the method comprises loading coffee grounds and hot water into a drinking vessel of the first aspect and operating pumping means of said drinking vessel to pump brewed coffee into a chamber of the drinking vessel such that it can be drunk.

The method may comprise any feature as described in relation to the first aspect.

According to a sixth aspect of the present invention there is provided a drinking vessel which is comprised of two separate sections, a base unit and a piston section.

Suitably, the piston section is pressed down into base section and forces hot water past coffee grounds located above a mesh plate at the bottom of the base section.

Suitably, the pressure forming below this mesh plate returns this brewed coffee up a pipe internal within the base section and back into the piston section.

Suitably, the coffee used will be ground to a finer consistency than ground coffee is currently available in, so as to increase surface area and reduce the brewing time required.

Suitably, finer coffee grinds stipulated located in the base section will be prevented from entering the piston cylinder by a micro fine mesh plate at the bottom of the base section.

Suitably, coffee brewed is returned by a chute or pipe into the piston cylinder section which becomes the new inner cylinder for the cup as a whole.

Suitably, a slit is used in the piston cylinder to allow coffee to flow into it during the entire process of pressing down the piston section Suitably, the cylinders in the base and piston sections are engineered to have little or no gap in-between them and a seal will be used around the circumference of the bottom of the piston cylinder to ensure a waterproof seal between the outer wall of the piston cylinder and the inner wall of the base cylinder.

Suitably, to allow perfect alignment a shape will be used for the cross section of both piston and base cylinder that allows only one possible angle of rotation for both cylinders to be aligned during the pressing down stage.

Suitably, the drinking vessel requires no external sections other than those required to form it, so on completion both piston and base section will have formed a single drinking vessel which will have a none permanent securing design to hold both sections together whilst the user drinks the coffee.

Suitably, cleaning will be performed by rinsing and performing the pressing and depressing process without any coffee and using a small amount of water and detergent.

Suitably, sometimes more cleaning may be necessary; for that reason the mesh plate is suitably removable by applying upward pressure and a tool will suitably be provided to perform this task, the other side of this tool will suitably have bristles to allow it to be used in cleaning the return chute/pipe.

Suitably, the device will protect the user from o-ring breaches, scalding from hot vapours, and heat of the liquid by its outer protecting shrouds which will form a barrier between the inner cylinders and the outer surface of the cup.

Suitably, a plate will be used to support the mesh with multiple holes in it to restrict the user to press at a specific rate governed by the number of holes and the diameter of each, thus the volume of liquid which may pass through at a given pressure.

Suitably, the shrouding sections when fully pressed together will make the cup narrower in circumference at the middle. Suitably, this is to aid with the later separation of the piston and base section.

Suitably, the piston section will have a removable lid over the top of it to stop spillage and keep the liquid hot whilst being designed so as to be comfortable for the user to press down on.

There may be provided any feature as described in the appended claims.

BRIEF DESCRIPTION OF DRAWINGS

The present invention will now be illustrated by way of example with reference to the accompanying drawings in which:

FIG. 1 is a view (X-Ray) of the overall design;

FIG. 2 is a view of the overall design from the top;

FIG. 3 is a view of the bottom of the base section (Detail not showing piston);

FIG. 4 is a view of the bottom of the base section showing mesh plate;

FIG. 5 is a view of the assembly showing the piston section with lid removed;

FIG. 6 is a view of the assembly shown from underneath;

FIG. 7 is a simplified diagram showing process step 1;

FIG. 8 is a simplified diagram showing process step 2;

FIG. 9 is a simplified diagram showing process step 2;

FIG. 10 is a simplified diagram showing process step 2;

FIG. 11 is a simplified diagram showing process step 3;

FIG. 12 is a simplified diagram showing process step 4;

FIG. 13 shows possible cross section shape of the interface between base section and piston section;

FIG. 14 shows a bottom up view;

FIG. 15 shows external shape possibilities;

FIG. 16 is a view of the base section showing return chute I pipe (without mesh plate);

FIG. 17 is a view of the bottom of the base section close up (without mesh plate); and, FIGS. 18 to 26 show various views of a second embodiment of a drinking vessel, namely:

DETAILED DESCRIPTION OF PREFERRED EMBODIMENTS

FIGS. 1 to 17 illustrate a first embodiment of a drinking vessel according to the present invention.

The drinking vessel comprises a base section 1 and a pump section (piston section) 2. The drinking vessel is adapted to receive coffee grounds and water to brew coffee and the drinking vessel comprises pump means adapted to pump brewed coffee into a chamber of the drinking vessel such that it can be drunk. The construction and operation of the drinking vessel will be described in more detail with reference to FIGS. 1 to 17.

Figure 1:
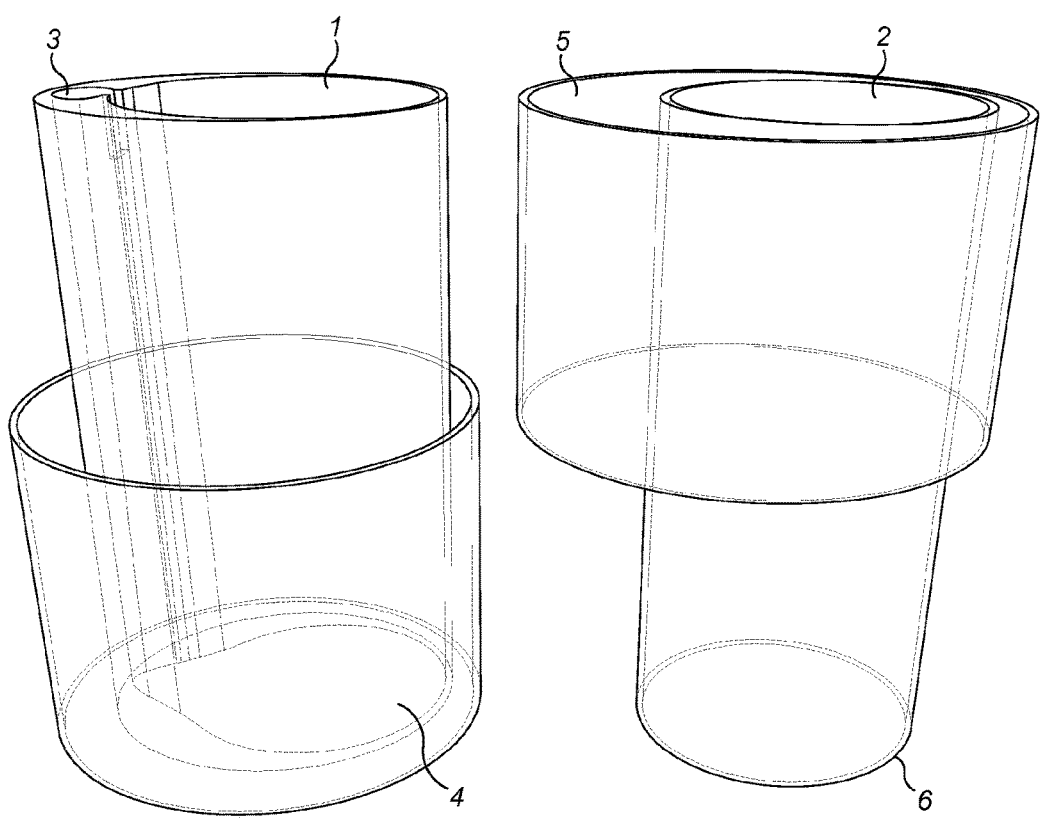
FIGS. 1 to 17 show various views of a first embodiment of a drinking vessel, namely.

FIG. 1 shows the overall design (X-ray view) in which are shown:
1. Base section
2. Piston section
3. Return chute/pipe
4. Mesh plate
5. Slit in piston cylinder
6. O rings/bung The drinking vessel comprises a first chamber adapted to receive hot water and coffee and which is defined by the base section 1. The drinking vessel comprises a filter means in the form of a mesh plate 4 located in the path of an outlet at the base of the first chamber. The drinking vessel comprises a second chamber which is defined by the interior of the piston section (pump section) 2. The piston section (pump section) 2 has a slit 5 in it to allow brewed coffee to enter and consequently as the piston section (pump section) 2 is located into the base section 1 in use the second chamber is also partially defined by the base section 1. The drinking vessel has a third chamber in the form of a return chute I pipe which conveys brewed coffee from the first chamber to the second chamber in use. The drinking vessel comprises pump means for pumping brewed coffee to the second chamber such that it can be drunk. In use, coffee grounds and water are combined in the first chamber and then the piston section (pump section) 2 is moved downwardly relative to the base section to decrease the volume of the first chamber pumping brewed coffee into the second chamber via the third chamber. At the same time the volume of second chamber is increased as the piston section (pump section) 2 is moved downwardly relative to the base section providing room for it to accommodate the brewed coffee pumped from the first chamber.

Figure 2:
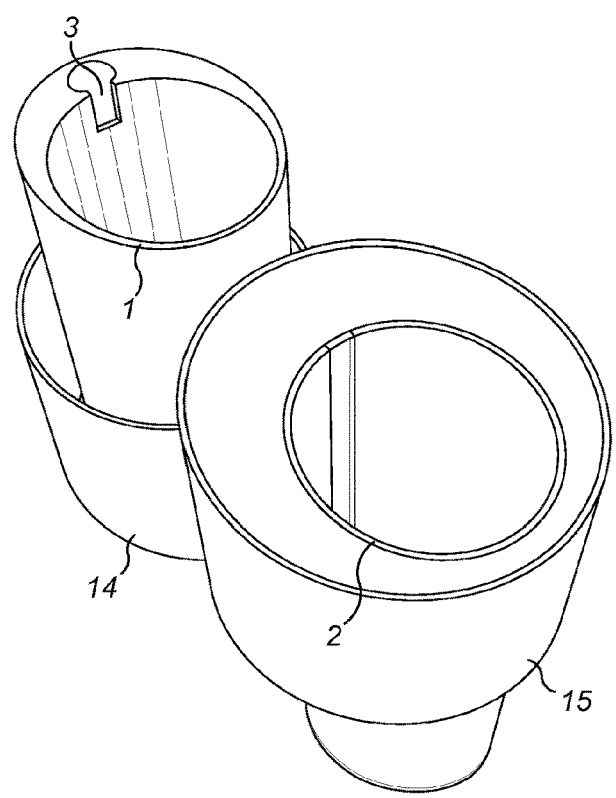
Figure 3:
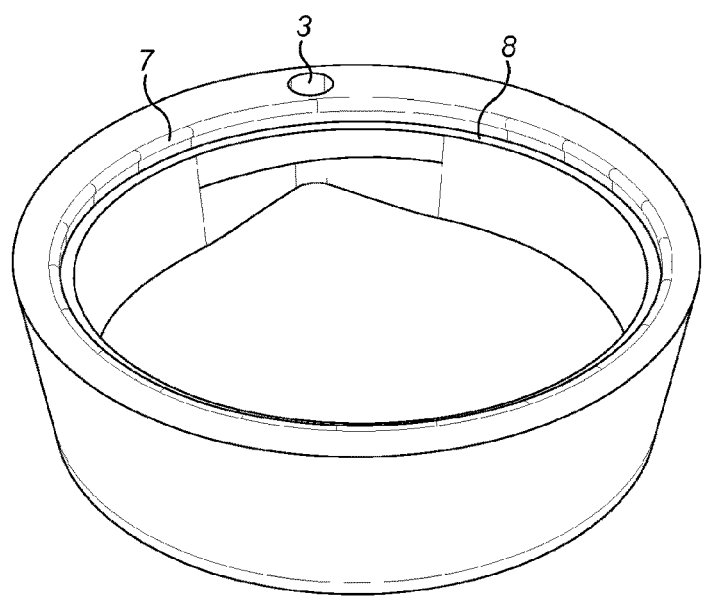
Figure 4:
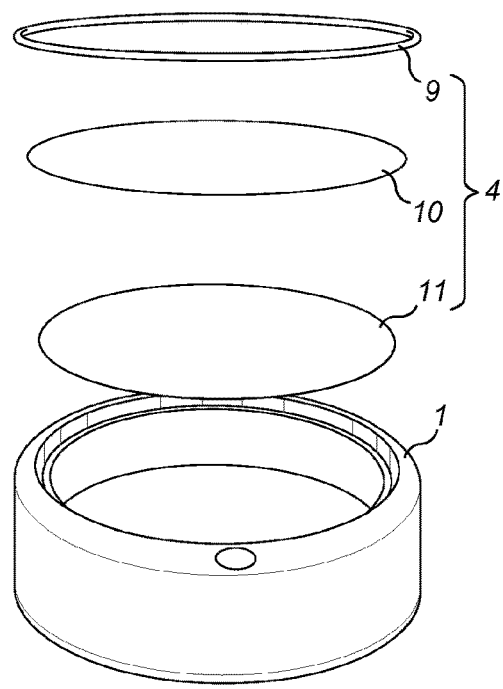

FIG. 2 shows the overall design (view from top) in which are shown:
1. Base section
2. Piston section (Detail shows lid open. This lid would be closed during operation to shield user)
3. Return chute/pipe
14. Base section shroud
15. Piston section shroud FIG. 3 shows the bottom of base section 1 (detail not showing piston) in which are shown:
7. Curved ridge
8. Mesh plate ridge FIG. 4 shows the bottom of base section 1 showing mesh plate 4 in which are shown:
9. Rubber o ring
10. Micro fine mesh
11. Restrictor plate Parts 9, 10 and 11 are collectively referred to as 4 (Mesh plate)

Figure 5:
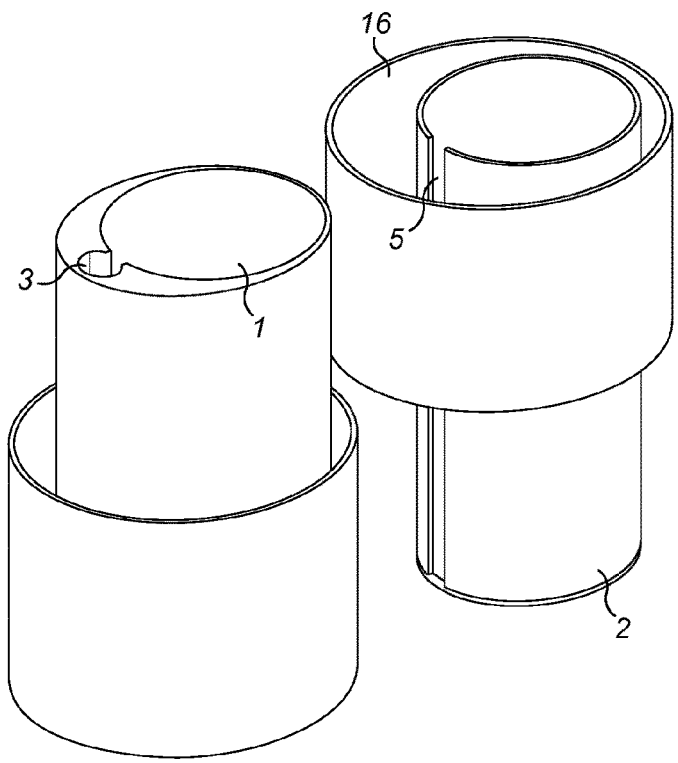
Figure 6:
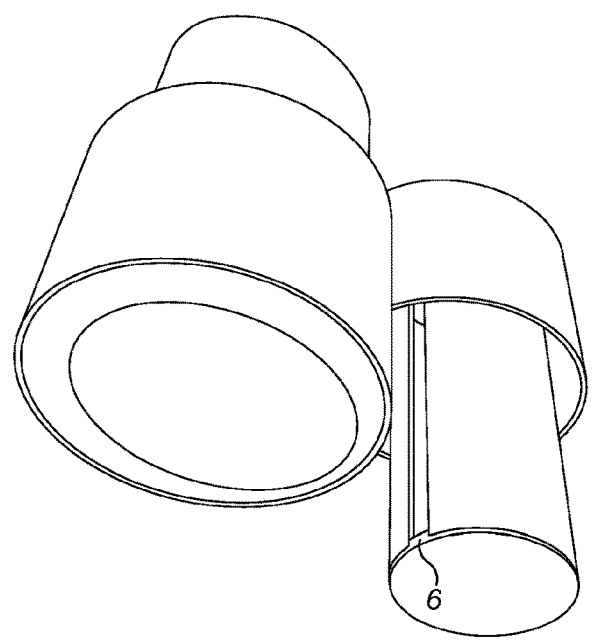

FIGS. 5 and 6 illustrate the overall usage of the drinking vessel.

FIG. 5 shows assembly showing piston section 2 with lid removed and in which is shown:
16. Gap section. Shields user from hot vapours and liquids.

FIG. 6 shows assembly shown from underneath.

FIGS. 7 to 12 are simplified diagrams only showing step by step process.

Figure 7:
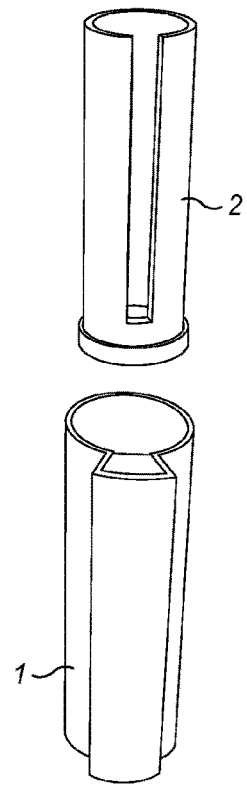

FIG. 7 shows process step 1.

Piston section 2 is placed over base section 1. In FIG. 7 it is shown as a perfect cylinder for illustration purposes (i.e. without shrouds 14 & 15). Also a sealing method between 1 and 2 (a rubber bung) is shown in FIG. 7. In an alternative embodiment (not shown) the rubber bung is replaced with one or 2 o rings (positioned in series) located at 6.

Finely ground coffee is used to a unique grind consistency which is poured into 1 by the user. This will collect on top of the mesh plate 4 after which hot water is then poured on top of the coffee and it is left for around 20 seconds to allow the coffee to settle on 4 before beginning to plunge 2 into 1.

Figure 8:
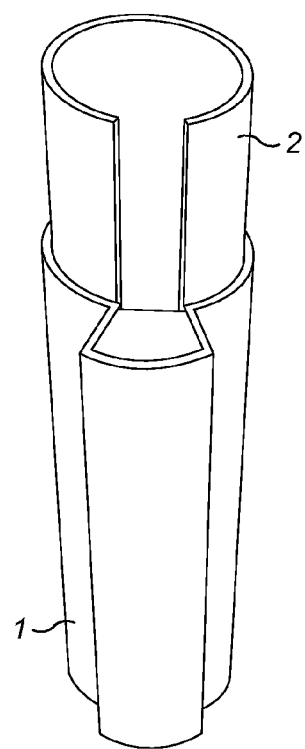
Figure 9:
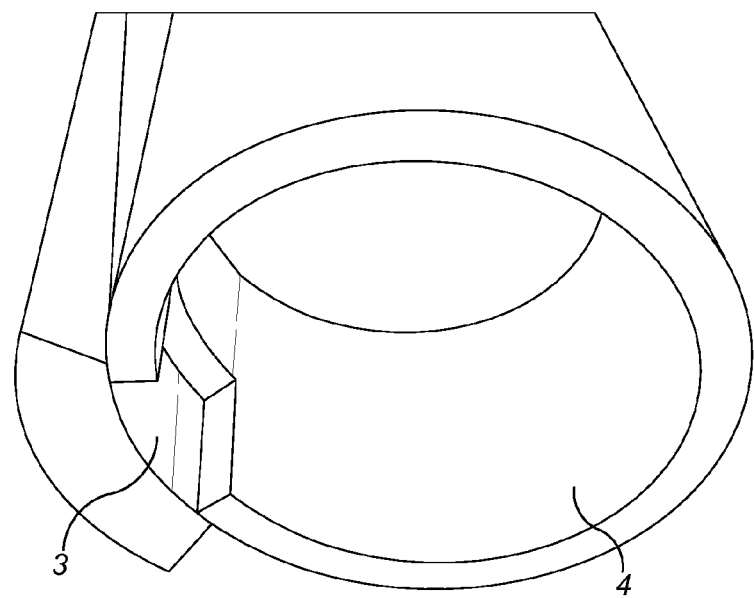
Figure 10:
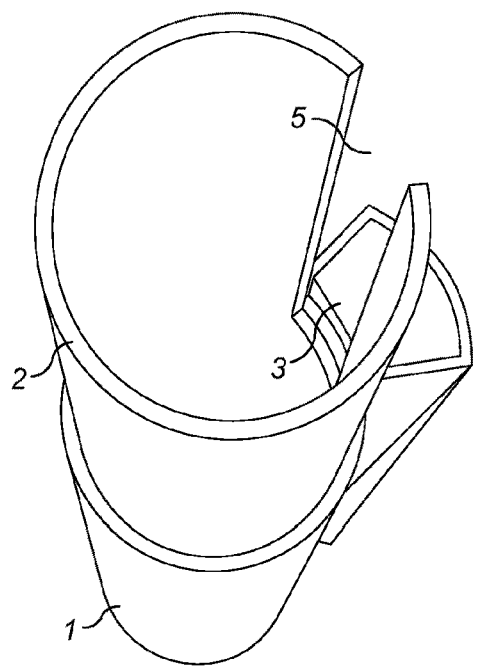

FIGS. 8, 9 and 10 show process step 2.

FIG. 8 shows the piston section 2 is now mid way through the brewing process and the internal section of piston section 2 is half full of brewed coffee. The coffee is compressing with the water towards mesh plate 4 and water is being forced through the coffee at the bottom of the base section 1. This increased pressure and flow rate significantly speeds up the extraction of the coffee flavour from the grounds.

Water is currently brewing by passing through the finely ground coffee and then mesh plate 4. FIG. 9 shows the base of base section 1 with the bottom removed for illustration purposes. The brewed coffee exits base section 1 through the base of return chute/pipe 3.

The now brewed coffee travels up return chute I pipe 3 and fills piston section 2 by passing through the slit in piston cylinder 5 that runs almost the entire length of piston section 2 as illustrated by FIG. 10.

Figure 11:
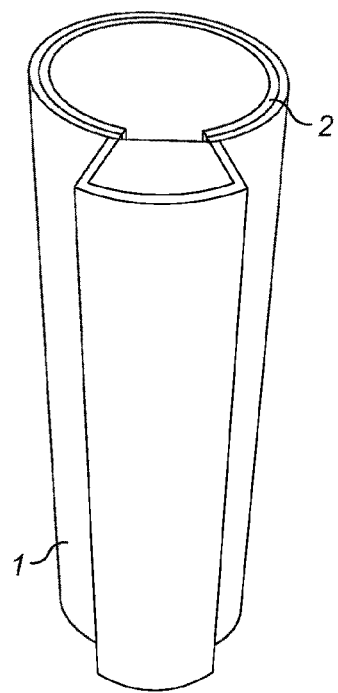

FIG. 11 shows process step 3.

The piston section 2 is now fully pressed and is aligned to the top of the base section 1. The coffee is now fully compressed up to the mesh plate 4 and all of the water has now passed through the coffee. In an alternative embodiment (not shown) a design option would be for the slit in piston cylinder 5 to be closed over at the top. This would seal off the small amount of brewed coffee left in return chute/pipe 3. The coffee is now ready to drink.

Figure 12:
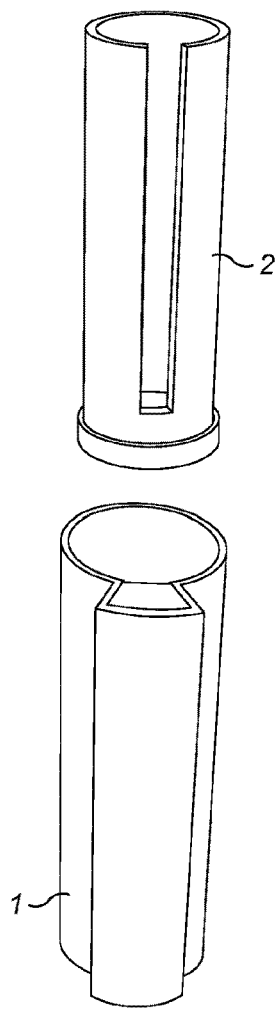

FIG. 12 shows process step 4.

To clean simply remove piston section 2 from base section 1 and tip base section 1 upside down. The waste coffee has now compacted into a 'coffee cake' and will easily exit base section 1. The user will then rinse base section 1 & piston section 2 under the tap and the process can be restarted.

FIGS. 13 to 17 illustrate other design features. Other design features are as follows:

1. The volume of water displaced by piston section 2 is equivalent to the water volume contained within return chute I pipe 3 and base section 1. This ensures that the vessel does not overflow as the maximum volume held by piston section 2 is less than the maximum volume held by base section 1.

Figure 13:
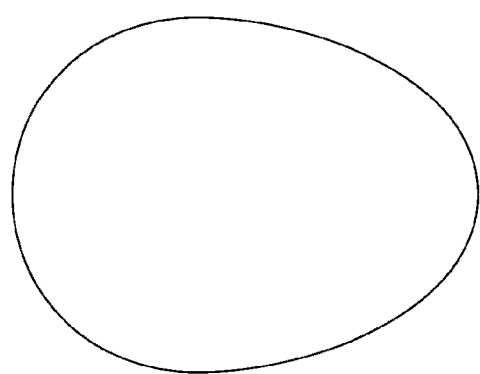

2. The base section 1 and piston section 2 will be shaped in a way which only allows one possible angle of rotation during the pressing down stage (see FIG. 13 example exaggerated for illustration purposes). This is to ensure that the slit in piston cylinder 5 aligns perfectly with return chute/pipe 3 during operation. This will not however likely affect the external design and feel of the drinking vessel as there is gap section 16 between this and base section shroud 14 and piston section shroud 15. FIG. 13 shows a possible cross section shape of the interface between base section 1 and piston section 2.

3. The drinking vessel protects the user from hot liquid and vapours. The main way this is achieved is by having base section shroud 14 and piston section shroud 15 such that it covers base section 1 and piston section 2 respectively; ensuring any spray (caused by breaching of O rings/bung 6) is contained. Additionally any hot vapours escaping will rise and be contained within piston section shroud 15 around piston section 2.

Figure 14:
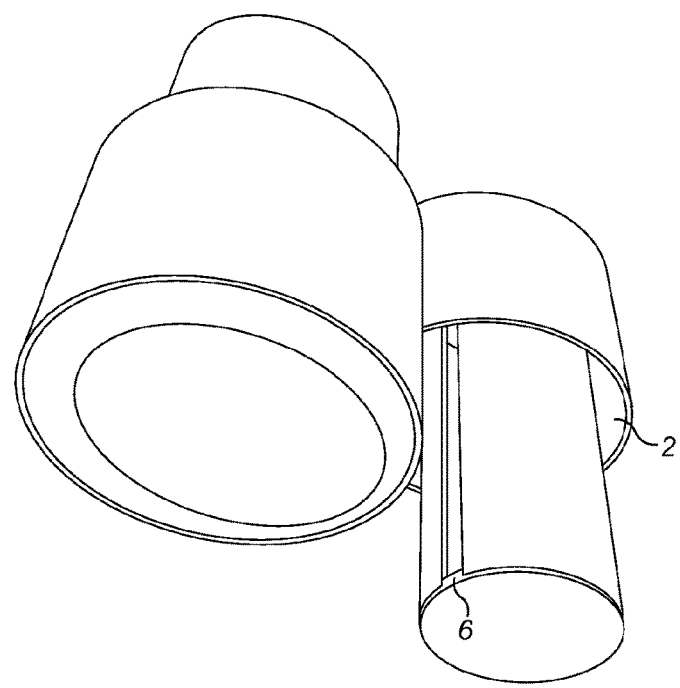

FIG. 14 shows a bottom up view.

4. The outside diameter of base section shroud 14 will measure no more than 75 mm to ensure it fits within most car cup holders and an additional section such as a screwed on base may be added to achieve this.

5. The drinking vessel when assembled will have a shape that will be slightly narrower towards its centre to allow the user to easily pull base section 1 and piston section 2 apart after use.

Figure 15:
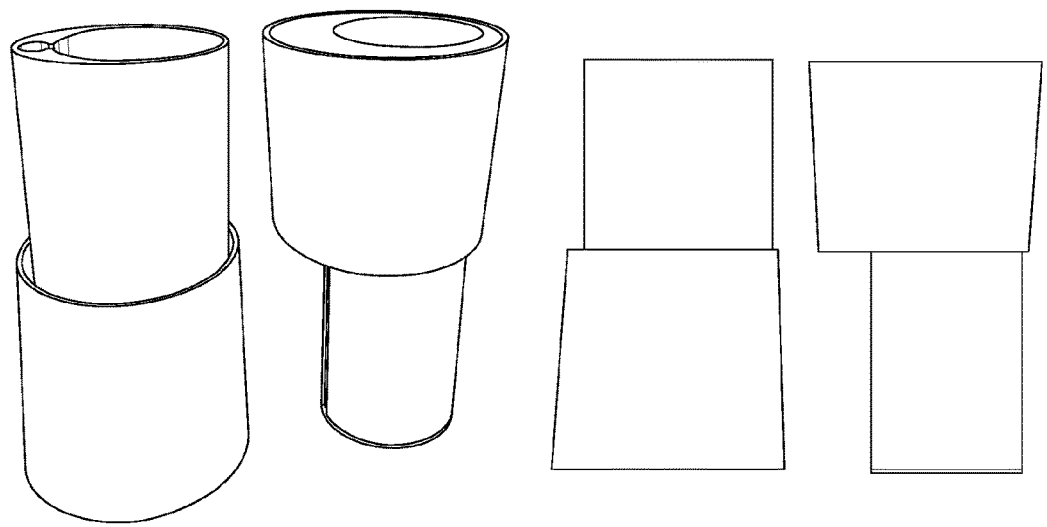

FIG. 15 shows external shape possibilities.

6. The lid at top of piston section 2 will be ergonomically designed so as not to cause the user any discomfort whilst plunging piston section 2 into base section 1. This means the contact surface will be curved and smooth in nature. It is expected the lid of the vessel will require a small ridge to drink from for ease.

7. A small opening will be provided in the lid as is standard on most takeaway drinking vessels which may have a sliding hatch over it.

8. The drinking vessel would require a more thorough clean from time to time. For this It will be appreciated that this preferred embodiment of the present invention may have the reason it will come with a cleaning tool. This would be a rod of the form of a simple pipe cleaner at one end and a hook at the other. The pipe cleaner would be used to clean out return chute/pipe 3 as shown in FIG. 16.

Figure 16:
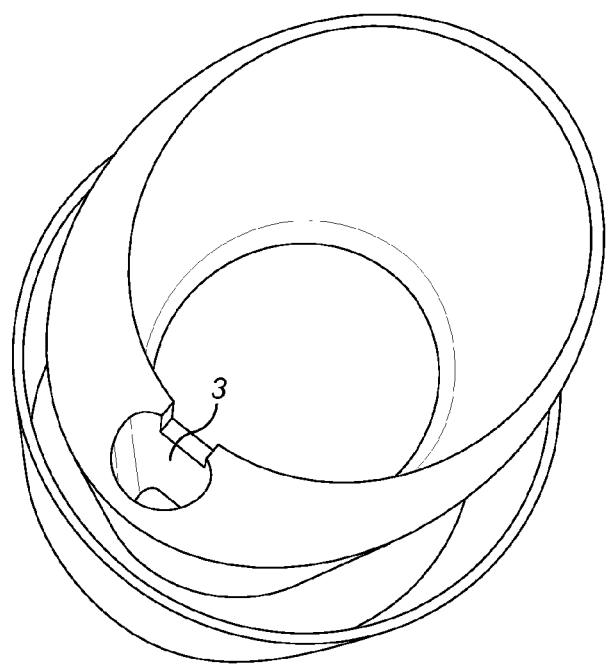

FIG. 16 shows base section 1 showing return chute/pipe 3 (without mesh plate 4)

9. The hooked end would be used to dislodge mesh plate 4 from its securing between curved edge 12 and bottom ledge 13 at the bottom of base section 1. The mesh plate 4 would be designed with a loop to allow it to be hooked by the tool.

10. A cap will be used on the top of return chute/pipe 3 to direct the coffee into a 'swirling effect' as it enters piston section 2 in a clockwise or anticlockwise direction to aid in mixing of any other ancillary products (i.e. milk, flavourings).

11. An additional mesh plate may be used after coffee is added to base section 1 but before hot water is added. This is to keep the coffee against mesh plate 4 in order to stop it floating freely within base section 1 and to ensure the hot water passes through all of the coffee the user adds.

12. In alternative embodiments (not shown) the position of the return chute I pipe 3 may be moved anywhere within base section 1 to allow for different shapes that we may wish to manufacture the drinking vessel in. It may even be placed towards the centre of base section 1. Then piston section 2 would have to be made in a doughnut shape to allow the return chute/pipe 3 to run through its centre during operation. The position of return chute I pipe 3 will not affect its function within the process as in each case it will just act to return the brewed coffee below mesh plate 4 to the inside of the piston section 2. The return chute I pipe 3 may need to be repositioned due to restrictions imposed by point 4 in Other Design Features—"The outside diameter of 14 will measure no more than 75 mm to ensure it fits within most car cup holders."

Figure 17:
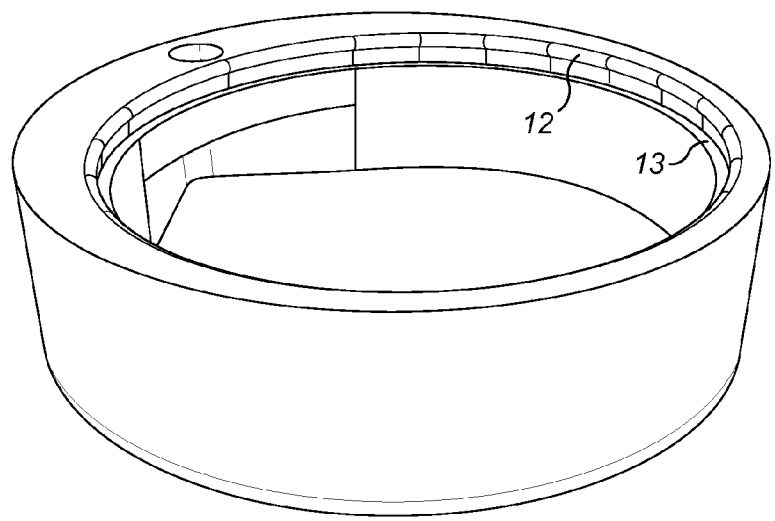

FIG. 17 shows bottom of base section 1 close up (without mesh plate 4)

13. Curved edge 12. This is to allow removal of mesh plate 4 when upward force is applied. During normal operation there will be only a strong downward force, so the curved edge will be significant enough to hold the mesh plate in place.

14. Bottom ledge 13. This is uncurved and so the mesh plate 4 will not be able to reach a lower point than this ridge. It will then be held in place between the curved edge 12 and this ridge 13.

It will be appreciated that this preferred embodiment of the present invention may fulfil the purpose of producing a fresh coffee at a much faster rate than is normally possible with fresh ground coffee, this may all be achieved within a single drinking vessel without any external apparatus being used.

It will be appreciated that this preferred embodiment of the present invention may have the following advantageous features:

It brews the coffee through the bottom of the drinking vessel and returns it within the same drinking vessel—So everything is contained within the actual drinking vessel, without external apparatus being required.

The drinking vessel has outer shrouds, 14 & 15 which shield the user from hot vapours coming out of the vessel, or potential o-ring failures at 6—It also acts as an insulator protecting the user when they hold the vessel, from the hot liquid contained within.

The brew process and cleaning is extremely simple—To be cleaned out, 1 is simply turned upside down; plunger 2 is extracted and given a tap. Due to the coffee being compacted by the brewing method it will fall out, and then it can be just rinsed out with water.

The process would require coffee to be ground to a specific (finer) consistency to speed up the brew time. The current standard for ground coffee would be too coarse and would produce a weak watery coffee if used in this vessel. This is due to the reduced brewing time that the device operates to.

As the coffee that is put into the vessel is ground at a finer grind than normal this gives a greater surface area allowing the coffee to be brewed much faster. A microfine mesh is used to stop grounds getting into the final brewed product.

The piston method further speeds up the brewing time compared to a standard method by creating a manual pressure from the user under which the coffee is brewed (in less than 30 seconds)

All of the water is pushed through the coffee at the base of the vessel (1), thus extracting the maximum flavour from the coffee at a faster rate—Brewing by just stirring the grounds in hot water is much slower than this method (approximately 3-4 minutes).

In a preferred embodiment of the invention it may be provided that:

The product brews a fresh coffee at a rapid rate within one drinking vessel comprising of two connected sections 1 and 2 without any need for external apparatus. Two cylinders are used; 1 and 2. 1 is filled with finely ground coffee and hot water, 2 is then inserted into the inside of the 1. Whilst pressing down, this forces the hot water past the coffee grounds which are held back by 4. This now brewed coffee liquid returns to the top of the drinking vessel by means of a 3 and fills the inside of 2. 2 will become entirely full of brewed coffee when 2 cannot be pressed down any further, and comes to rest attaching to 1. The coffee can now be drunk.

FIGS. 18 to 26 illustrate an alternative embodiment of a drinking vessel according to the present invention.

The drinking vessel 100 comprises a base section 101 and a pump section 102. The drinking vessel 100 is adapted to receive coffee grounds and water to brew coffee and the drinking vessel 100 comprises pump means adapted to pump brewed coffee into a chamber of the drinking vessel such that it can be drunk. The construction and operation of the drinking vessel 100 will be described in more detail with reference to FIGS. 18 to 26.

The drinking vessel 100 of the second embodiment differs from that of the first embodiment in that the return chute/pipe is replaced by having a base section with an inner wall 101a and outer wall 101b encircling the inner wall 101a. The space between walls 101a and 101b provides a chamber (third chamber) 170 which takes the place of the return chute/pipe.

The drinking vessel 100 comprises a first chamber 150 adapted to receive hot water and coffee and which is defined by the base section 101. The drinking vessel comprises a filter means in the form of a mesh plate 104 located in the path of an outlet at the base of the first chamber 150.

The drinking vessel comprises a second chamber 160 which is defined by the interior of the pump section 102. The pump section 102 has a plurality of slits 105 in it to allow brewed coffee to enter and consequently as the pump section 102 is located into the base section 101 in use the second chamber 160 is also partially defined by the base section 101.

In use, the space enclosed by wall 101a is sub-divided into the first and second chambers 150,160 by a pump member 180 of the pump section 102 with the first chamber 150 lying below it and the second chamber 160 lying above it. Consequently, in use, as the pump section 102 is moved downwardly relative to the base section the movement of the pump member 180 results in the volume of the first chamber 150 decreasing and the volume of the second chamber 160 increasing.

The third chamber 170 conveys brewed coffee from the first chamber 150 to the second chamber 160 in use. The drinking vessel comprises pump means for pumping brewed coffee to the second and third chambers 160, 170 such that it can be drunk.

In use, coffee grounds and water are combined in the first chamber 150 and then the pump section 102 is located such that the pump member 180 locates into the first chamber 150. The pump section 102 is then moved downwardly relative to the base section 101 to decrease the volume of the first chamber 150 pumping brewed coffee into the third chamber 170. Once the third chamber is full the brewed coffee then flows over wall 101a into the second chamber 160 via slits 105. At the same time the volume of first chamber 150 is reduced the volume of the second chamber 160 is increased as the pump section 2 is moved downwardly relative to the base section. This thus provides room for the second chamber 160 to accommodate the brewed coffee pumped from the first chamber.

The drinking vessel 100 of the second embodiment has the following main parts and features:

101. Base section
101a. Base section inner wall
101b. Base section outer wall
102. Pump section
104. Mesh plate (filter means)
105. Pump section slits
106. O ring
114. Base section extension
115. Pump section shroud
150. First chamber
160. Second chamber
170. Third chamber
180. Pump member
190. Outlets
195. Lip In the embodiment of FIGS. 18 to 26 the first chamber 150 defined by wall 101a is smaller than the first chamber of the embodiment of FIGS. 1 to 17. It is located within a larger chamber of the base (third chamber) 170 defined by wall 101b. As noted, the return chute/pipe of the embodiment of FIGS. 1 to 17 is replaced by using the volume of space created between the outside of wall 101a and the inside of wall 101 b.

The operation of the drinking vessel of the embodiment of FIGS. 18 to 26 is as follows.

Figure 18:
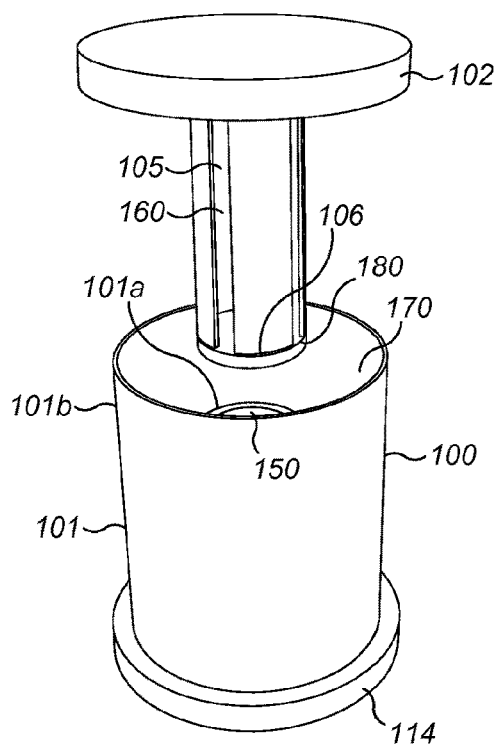
FIG. 18 shows the drinking vessel with pump section shroud omitted to show pump section prior to sliding into internal base section.

FIG. 18 shows the entire model of the drinking vessel 100 with the pump shroud section 115 removed. This is at the point prior to operation where the user has filled first chamber 150 defined by wall 101a with coffee and hot water this will then flow through into the third chamber 170 defined by the space between the outer side of wall 101a and the inner side of wall 101b.

The pump section 102 has multiple slits 105 as it does not need to line up with a return pipe and can therefore receive the returned brewed coffee water from any angle.

In use, the pump section 102 is pressed downwards so the pump member 180 compresses water and coffee towards the mesh plate 104 situated at the bottom of the first chamber 150 defined by wall 101a.

In use, the mesh plate 104 holds the coffee granules back allowing hot water and brewed coffee to pass through them.

Figure 19:
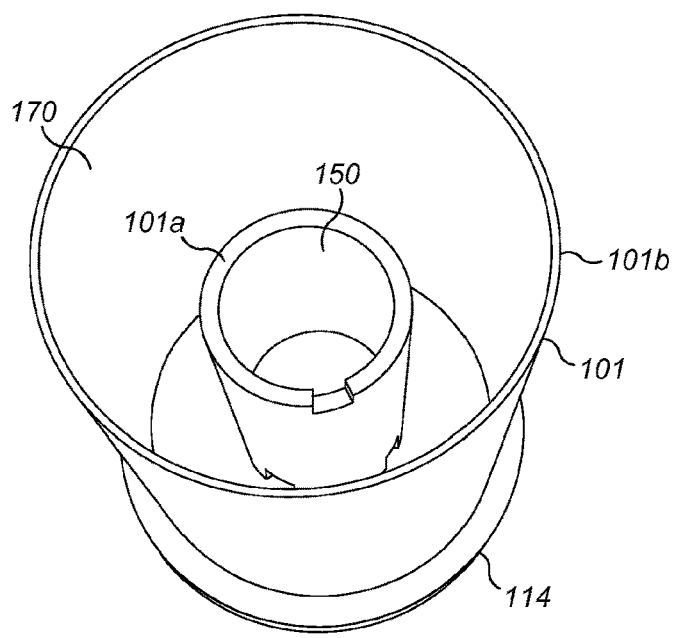
FIG. 19 is a view of the base section from above.
Figure 20:
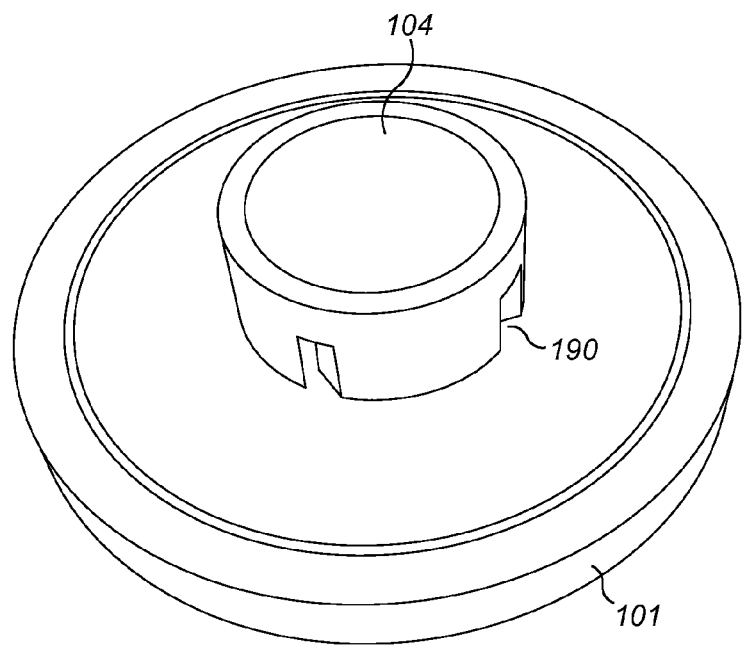
FIG. 20 is a view of the base section with walls omitted to show base of first chamber with mesh filter means in place.

FIGS. 19 and 20 illustrate the construction of the base section 101 with FIG. 20 showing the positioning of the mesh plate 104 over flow control means in the form of outlets 190 from the first chamber 150.

Figure 21:
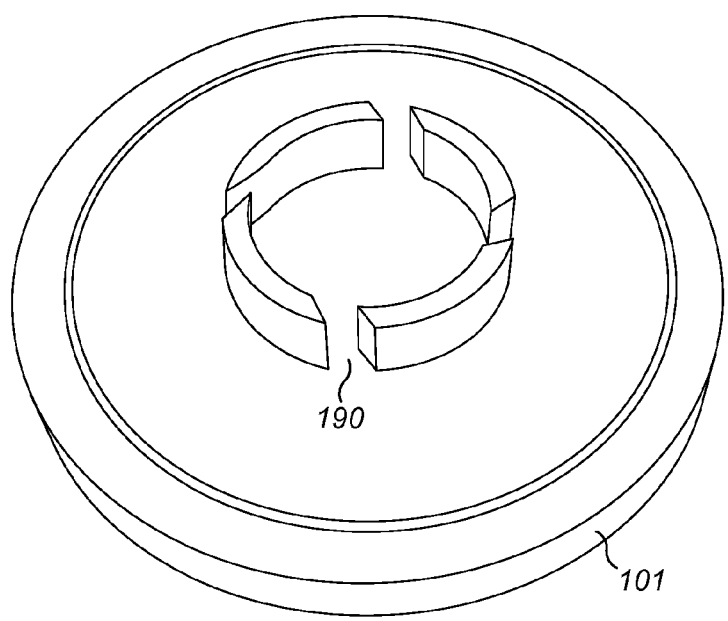
FIG. 21 is a view of the base section with walls and mesh filter means omitted to show angled outlets.
Figure 22:
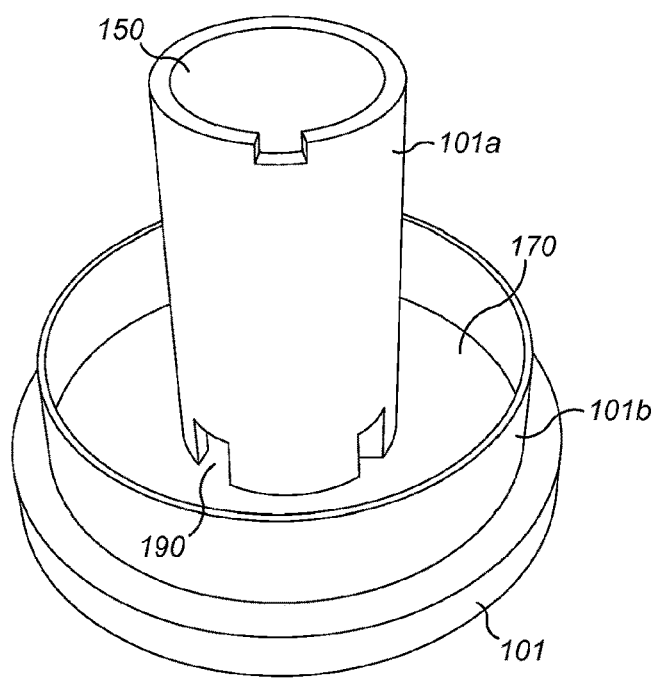
FIG. 22 is a view of the base with inner wall shown and outer wall partially shown.

Having passed through the mesh plate 104 the water/brewed coffee then passes into the third chamber 170 between the outside of wall 101a and the inside of wall 101b there it is swirled into a mixing action by the angular design of outlets 190 of the base supporting wall 101a. The construction of the outlets is best illustrated by FIG. 21.

In this design the pump section shroud 115 extends for the length of the pump section 102 and extends below the pump member 180 such that water can not be pumped from the first chamber 150 until the shroud 115 is already in position to protect the user in the event that the seal between pump member 180 and wall 101a is breached.

The base section 101 has a much reduced shroud compared to the first embodiment but the base extends out beyond wall 101b to provide stability for the user during compression of the pump section 102 in use.

Figure 23:
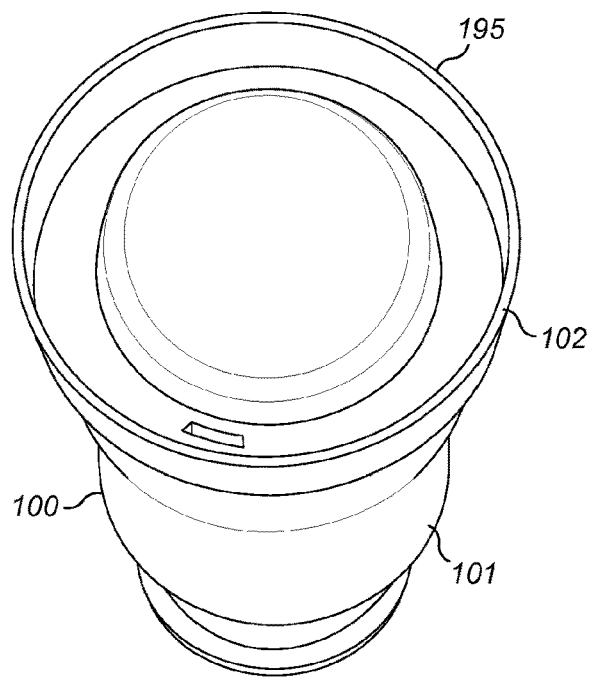
FIG. 23 is a view of the drinking vessel from above as the pump section is slid down over the base section.

To aid in pressing down the top of the pump section 102 this is rounded and a raised lip 195 will be used at the edge of the lid of the pump section 102 to aid in drinking as best illustrated by FIG. 23.

Figure 24:
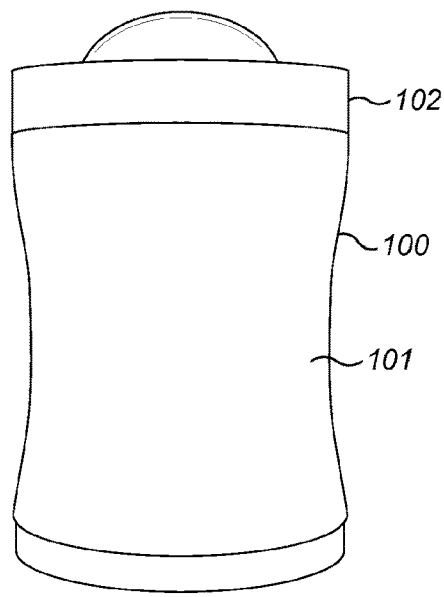
FIG. 24 is a view of the drinking vessel in the fully brewed and ready to drink configuration.
Figure 25:
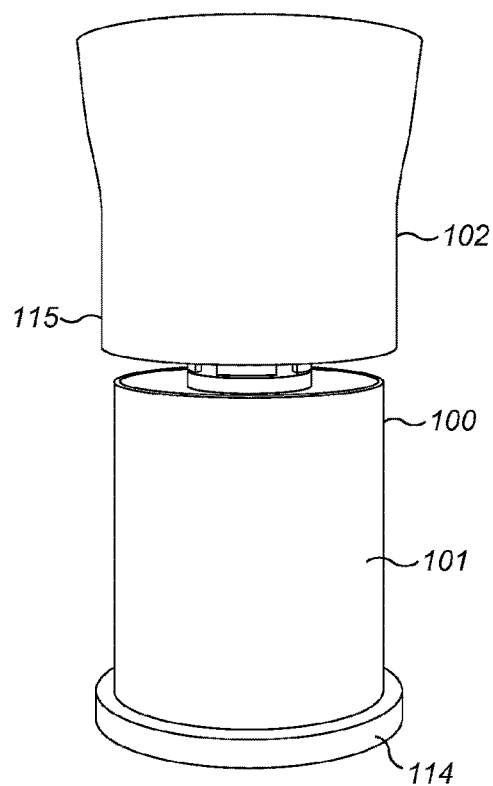
FIG. 25 is a view of the drinking vessel showing the pump section over base section with the lower 30% of the shroud omitted to show pump member.
Figure 26:
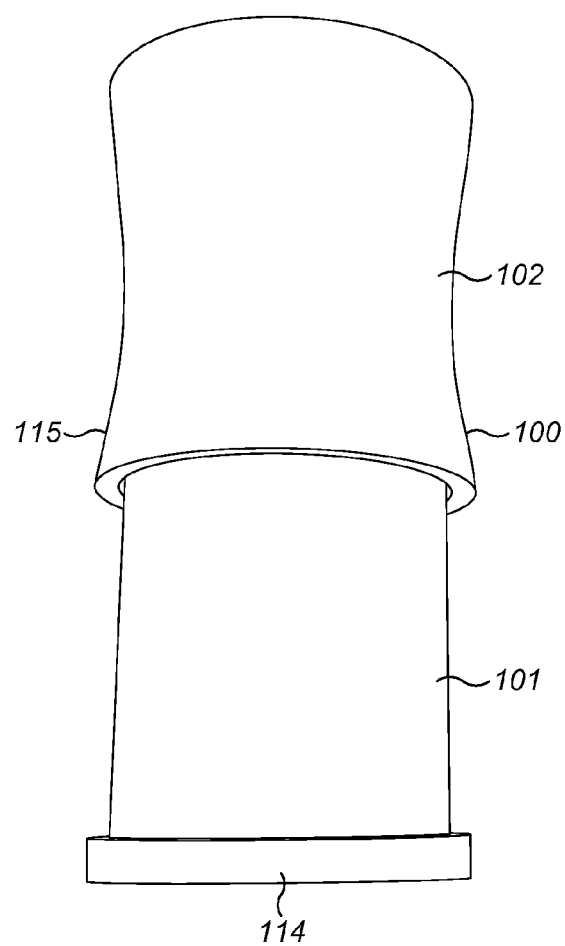
FIG. 26 is a view of the drinking vessel showing the pumping stage with the shroud fully shown; and, FIGS. 27 to 32 show various views of a third embodiment of a drinking vessel, namely.
Figure 27:
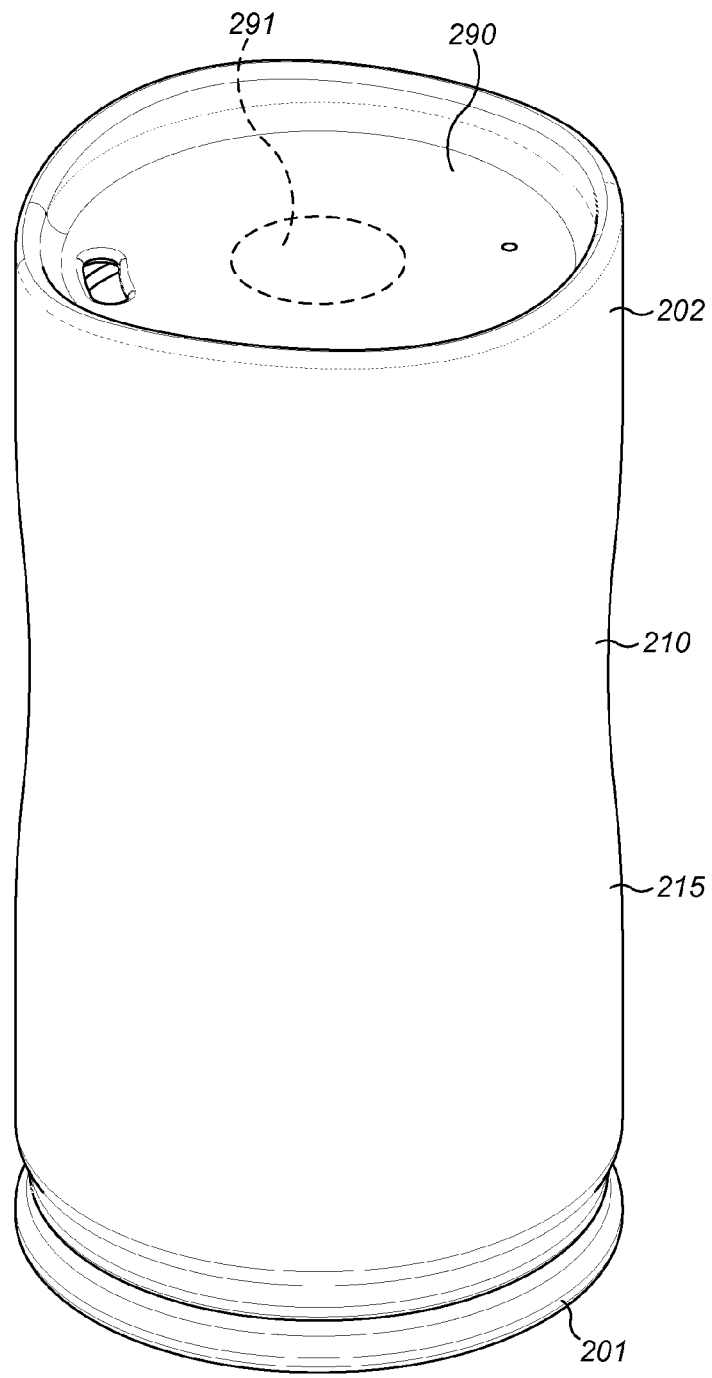
FIG. 27 shows the complete drinking vessel.
Figure 28:
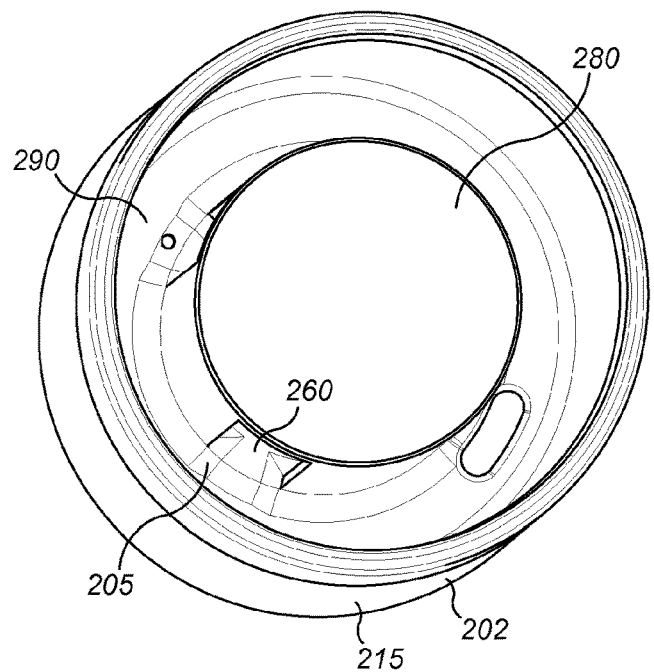
FIG. 28 shows a pump section.
Figure 29:
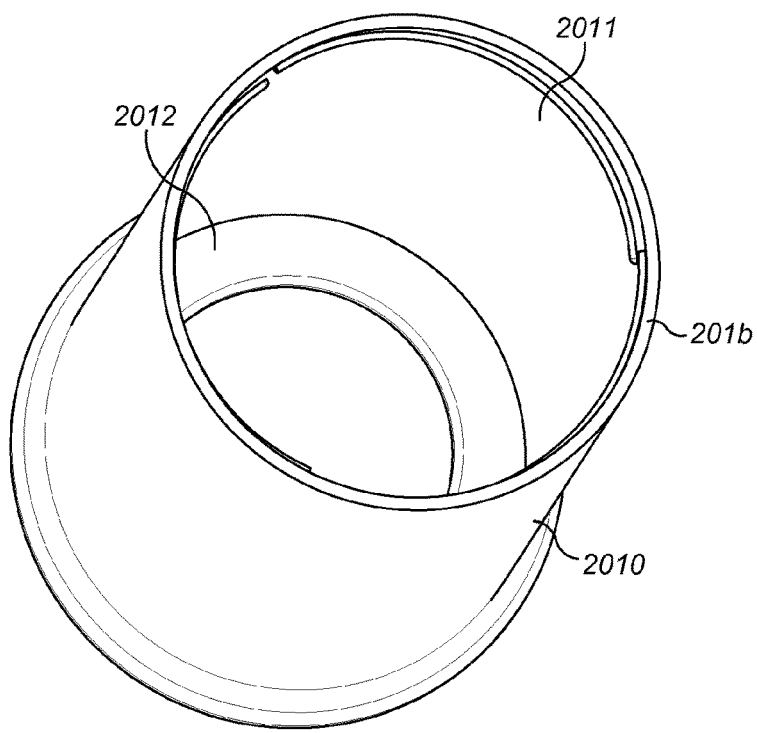
FIG. 29 shows a base section outer part.
Figure 30:
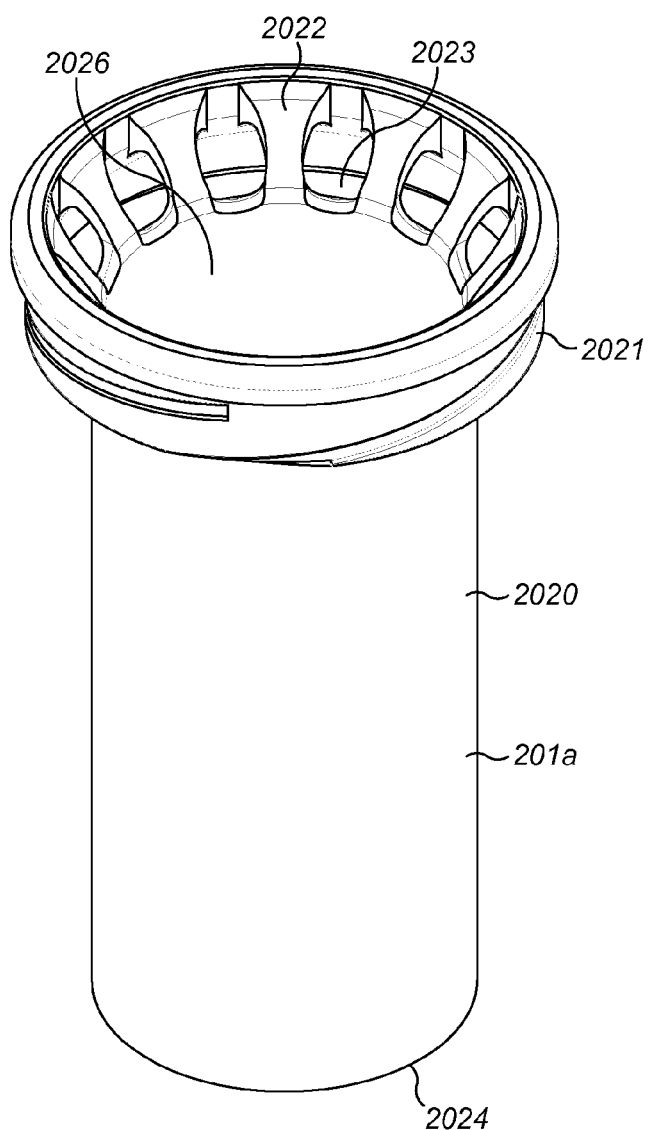
FIG. 30 shows a base section inner part.
Figure 31:
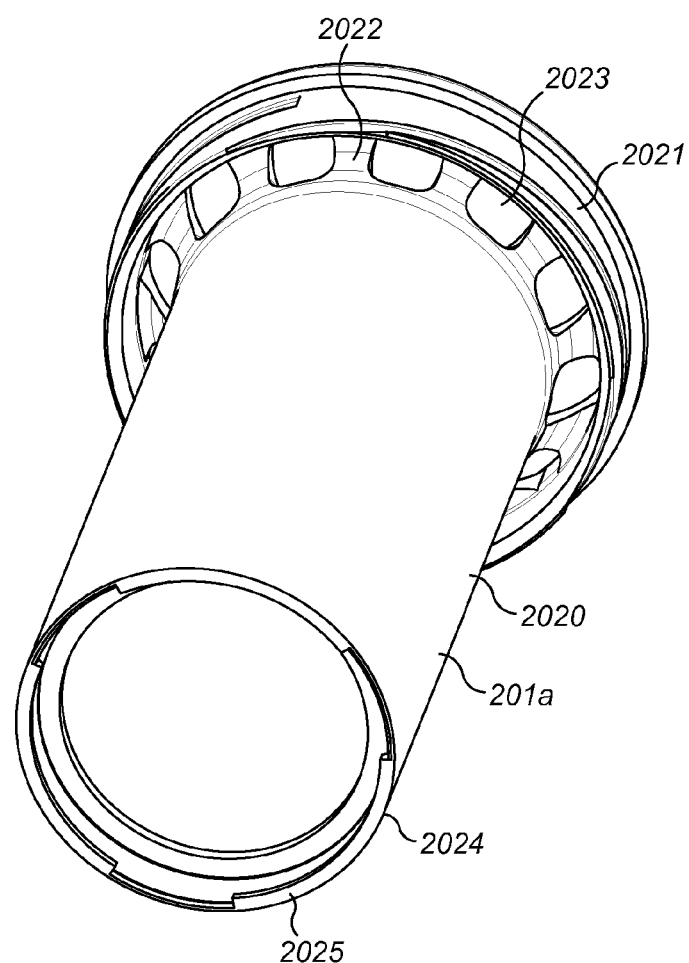
FIG. 31 shows another view of the base section inner part.
Figure 32:
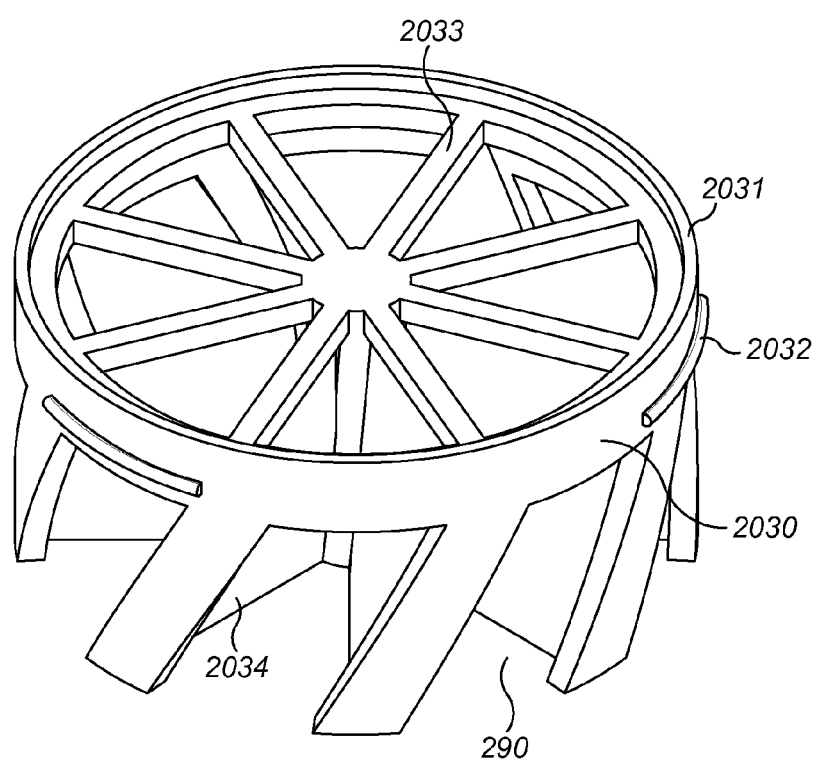
FIG. 32 shows a flow control means.

When the pump section 102 is fully pressed down to meet wall 101b as shown by FIG. 24 the coffee grounds will be compressed within the first chamber 150 defined by wall 101a and the inside of the space enclosed by wall 101b (which space comprises both the second and third chambers 160, 170) will be filled with a brewed coffee solution. In this drinking configuration of the drinking vessel the second and third chambers 160, 170 are open to one another at their upper parts allowing brewed coffee to flow there between.

It will be appreciated that this preferred embodiment of the present invention may fulfil the purpose of producing a fresh coffee at a much faster rate than is normally possible with fresh ground coffee, this may all be achieved within a single drinking vessel without any external apparatus being used.

It will be appreciated that this preferred embodiment of the present invention may have the following advantageous features:

Reduces the amount of brew time as
a. Not all of the water needs to pass through the coffee therefore different versions could be made with varying dimensions of first chamber 150 to vary the strength and speed. b. The water will be poured into first chamber 150 after the coffee is placed in there so brewing will start immediately as the water passes the mesh plate to fill the third chamber 170.

O-ring or bung 106 friction will be less as the process requires a smaller diameter for 106 which will reduce friction against the inside wall of 101a The piston shroud 115 is now larger and will line up piston section 102 with base section 101 before the pump member 180 enters the first chamber 150 which will also ensure the user is protected before the compression of hot water begins.

As the pipe 3 is now replaced the shape of the entire model can now be perfectly round as the return brewed water now mixes with the non brewed water uniformly around wall 101a allowing the entire model to be perfectly round. This has a secondary benefit of the entire model having an overall lesser diameter which will mean it will potentially fit in more car cup holders.

Now that both base section 101 and pump section 102 can be made into perfectly circular cross section cylinders the user will be able to twist the two when separating after use this may make it easier to separate after drinking. As it will enable the user to break the inertia forces between the o ring 106 and the inside wall of base section 101a.

In this set up an espresso or double espresso can be made from the smaller first (brew) chamber 150 so the device can offer different drink options to the user.

The size of first (brew) chamber 150 can be varied in different models so different strengths of coffee would be available in different models.

FIGS. 27 to 32 illustrate an alternative embodiment of a drinking vessel according to the present invention.

The drinking vessel 200 comprises a base section 201 and a pump section 202. The drinking vessel 200 is adapted to receive coffee grounds and water to brew coffee and the drinking vessel 200 comprises pump means adapted to pump brewed coffee into a chamber of the drinking vessel such that it can be drunk. The construction and operation of the drinking vessel 200 will be described in more detail with reference to FIGS. 27 to 32.

The drinking vessel 200 of the third embodiment has a similar operation to that of the second embodiment but differs in construction, particularly in the construction of the base section 201.

The base section 201 comprises an outer part 2010 and an inner part 2020. The inner part 2020 comprises an upper region 2021 which is threaded and adapted to be threaded into engagement with a corresponding thread at an upper region 2011 of the outer part 2010.

The outer part 2010 comprises a base wall 2012 and a tubular side wall 201b which is threaded on the inside thereof at an upper region 2011 of the outer part 2010.

The inner part 2020 comprises a tubular wall 201a which is connected to the upper region 2021 by spacers 2022 which define apertures 2023 there between. The top of the wall 201a lies below the top of the inner part 2020.

When assembled by threading the inner section 2020 into engagement with the outer section 2020 the outer wall 101b encircles the inner wall 101a. The space inside the inner wall 101a provides a chamber which is sub divided in use by the pump member 280 of the pump section 202 to provide first and second chambers of varying relative capacity depending on the position of the pump section 202 relative to the base section 201. The space between walls 101a and 101b provides a third chamber.

The construction of the inner part 2020 is such that, in use, liquid can travel from a third chamber defined between the tubular wall 201a of the inner part 2020 and the tubular wall 201b of the outer part 2010 into a second chamber located in space 2026 defined on the inside of tubular wall 201a when said space 2026 is occupied by the pump member 280 of the pump section 202.

The drinking vessel 200 comprises a first chamber located in cavity 2026 defined on the inside of tubular wall 201a and adapted to receive to receive hot water and coffee grounds when said space 2026 is not occupied by the pump member 280 of the pump section 202.

The lower region 2024 of the inner part 2020 is adapted to receive a flow control means 2030 and comprises retaining protrusions 2025 adapted to hold the flow control means 2030 in place when it is twisted into position.

The flow control means 2030 comprises a plurality of angled outlets 290 adapted to cause mixing of liquid as it passes through the flow control means 2030 into a third chamber in use, the flow control means 2030 comprises a ring part 2031 carrying protrusions 2032 adapted to hold the flow control means 2030 in place when it is twisted into position at the lower region of the inner part 2020. Spokes 2033 extend inwardly from the ring part 2031 and are adapted to support a mesh filter (not shown) in use. Fins 2034 depend from the spokes 2033. When the base section 201 is assembled the bases of fins 2034 contact the base wall 2012 of the outer part 2020. The flow control means 2030 thus separates the first chamber from the third chamber and allows fluid communication there between.

The drinking vessel comprises a filter means in the form of a mesh plate (not shown) located onto the flow control means 2030 and sandwiched in place between the flow control means 2030 and the inner section 2020 when the flow control means 2030 is connected to the inner section 2020. Thus, in use, the filter means is located in the path of an outlet at the base of the first chamber.

The drinking vessel 200 comprises a second chamber 260 which is defined by the interior of the pump section 202. The pump section 202 has a plurality of slits 205 in it to allow brewed coffee to enter and consequently as the pump section 202 is located into the base section 201 in use the second chamber 260 is also partially defined by the base section 201 inner part 2020 wall 201a.

The pump section 202 has a shroud 215 extending down from a lid part 290 and which shroud 215 overlies the wall 201b of the outer part 2010 of the base section 201 when the vessel 200 is in a drinking configuration.

In use, the space enclosed by wall 201a is sub-divided into first and second chambers by a pump member 280 of the pump section 202 with the first chamber lying below it and the second chamber lying above it. Consequently, in use, as the pump section 202 is moved downwardly relative to the base section the movement of the pump member 280 results in the volume of the first chamber decreasing and the volume of the second chamber increasing.

The third chamber conveys brewed coffee from the first chamber to the second chamber in use. The drinking vessel 200 comprises pump means for pumping brewed coffee to the second and third chambers such that it can be drunk.

In use, with the base section 201 assembled coffee grounds and water are combined in the base section 201 in the first chamber which is defined within space 2026. Water flows through a bed of coffee on the filter means and through the flow control means 2030 such that brewed coffee flows into the third chamber and the liquid level in the first and third chambers reaches equilibrium. Depending on the type of coffee to be brewed, If desired, further water can then be added to the first chamber. The pump section 202 is then located such that the shroud 215 locates over the outer part 2010 of the base section 201 which aligns the pump member 280 with the space 2026. The pump member 280 then locates into the space 2026 forming a first chamber in the part of space 2026 below the pump member 280 and a second chamber in the part of space 2026 above the pump member 280. The pump section 202 is then moved downwardly relative to the base section 201 to decrease the volume of the first chamber pumping brewed coffee into the third chamber defined between walls 201a and 201b. Once the third chamber is full the brewed coffee then flows over wall 201a through apertures 2023 and slits 205 into the second chamber 260. At the same time the volume of first chamber is reduced the volume of the second chamber within space 2026 is increased as the pump section 202 is moved downwardly relative to the base section 201. This thus provides room for the second chamber 260 to accommodate the brewed coffee pumped from the first chamber.

In an alternative embodiment (not shown) the pump section lid part 290 comprises an aperture in a region 291 which is selectively closed by a closure member. In use, this can allow a user to introduce milk and/or sugar and/or water into the second chamber which may allow a coffee to be brewed to a desired style.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A drinking vessel adapted to receive ground coffee and hot water for brewing coffee so that the brewed coffee may be drunk from the vessel, comprising:
   a base section having a first chamber; and,
   a pump member adapted for an operable communication with the base section so that the pump member is slidably moveable upwardly and downwardly relative to the base section; the pump member comprising
      a hand operated piston operable in the first chamber and arranged to fit closely within the first chamber of the base section;
      sidewall parts defining a plurality of apertures;
      a shroud adapted to form an outer surface of the drinking vessel; and,
      a filter located at a base of the first chamber;
      wherein the hand operated piston divides the first chamber into the first chamber below the piston and a second chamber above the piston as the piston is urged downwardly in use;
   wherein
   the base section further comprises an outer part with an outer wall and an inner part with an inner wall, the outer wall and the inner wall defining a third chamber arranged to convey brewed coffee from the first chamber into the second chamber via the plurality of apertures of the pump member as the piston is urged downwardly in use; and, the shroud overlies the outer wall of the outer part of the base section.

2. The drinking vessel of claim 1, whereas the plurality of apertures are slits which extend longitudinally along substantially the length of the pump member.

3. The drinking vessel of claim 1, wherein the shroud extends the length of the pump member.

4. The drinking vessel of claim 1, wherein the outer part comprises a base wall and a tubular outer wall, the tubular outer wall having an upper region:

the inner part comprises a tubular inner wall with an upper region, the upper region of the inner part including a plurality of spacers defining a plurality of inner part apertures therebetween; and, as the piston is urged downwardly, brewed coffee flows from the third chamber through the plurality of inner part apertures and into the second chamber.

5. The drinking vessel of claim 4, wherein the tubular outer wall has a threaded upper region:

the tubular inner wall has a lower region and a threaded upper region; and, the threaded upper region of the inner part being adapted to be threaded into engagement with the threaded upper region of the outer part.

6. The drinking vessel of claim 4, wherein the upper region of the inner part extends radially outwardly away from the tubular inner wall.

7. The drinking vessel of claim 4, wherein the lower region of the inner part includes a removable flow control means.

8. The drinking vessel of claim 7, wherein the lower region of the inner part comprises retaining protrusions adapted to hold the flow control means in place when twisted into position.

9. The drinking vessel of claim 7, wherein the filter is located on the flow control means and positioned securely between the flow control means and the lower region of the inner part when the flow control means is connected to the lower region of the inner section.

10. The drinking vessel of claim 7, wherein the flow control means comprises:

a ring part;

a plurality of spokes extending inwardly from the ring part; and, a plurality of fins depending from the spokes, the fins defining a plurality of angled outlets adapted to cause mixing of liquid as it passes through the flow control means.

11. A method of brewing coffee, comprising the successive steps of:

obtaining the drinking vessel of claim 1;

putting ground coffee into the first chamber of the base section;

introducing hot water into the base section;

allowing the water to pass through the ground coffee until liquid levels in the first and third chambers are in equilibrium; and, operating the piston to pump water remaining in the first chamber through the coffee into the third chamber, the operating including conveying the brewed coffee through the plurality of apertures.

12. The method of claim 11, wherein brewed coffee is conveyed from the third chamber to the second chamber.

13. The method of claim 11, wherein the filter remains stationary relative to the base section.

14. The method of claim 11, wherein the pump member moves relative to the filter.

15. The method of claim 11, wherein the steps of (i) allowing water to pass through the ground coffee extracts soluble material from the coffee; and, (ii) pumping water through the coffee extracts non soluble oils to form an emulsion.

16. The drinking vessel of claim 10, wherein the fins are arranged to contact the base wall of the outer part.

* * * * *